(12) United States Patent
Shigemoto et al.

(10) Patent No.: US 8,189,674 B2
(45) Date of Patent: May 29, 2012

(54) DECODING METHOD, PROGRAM FOR DECODING METHOD, RECORDING MEDIUM WITH RECORDED PROGRAM FOR DECODING METHOD, AND DECODING DEVICE

(75) Inventors: Daijou Shigemoto, Tokyo (JP); Masashi Miyazaki, Tokyo (JP)

(73) Assignee: Sony Corporation (JP)

( * ) Notice: Subject to any disclaimer, the term of this patent is extended or adjusted under 35 U.S.C. 154(b) by 682 days.

(21) Appl. No.: 12/309,702

(22) PCT Filed: Jun. 20, 2007

(86) PCT No.: PCT/JP2007/062834
§ 371 (c)(1),
(2), (4) Date: Jan. 23, 2009

(87) PCT Pub. No.: WO2008/013020
PCT Pub. Date: Jan. 31, 2008

(65) Prior Publication Data
US 2009/0316792 A1 Dec. 24, 2009

(30) Foreign Application Priority Data
Jul. 26, 2006 (JP) ................ P2006-202973

(51) Int. Cl.
*H04N 7/12* (2006.01)
*H04N 11/04* (2006.01)

(52) U.S. Cl. ......... 375/240.23; 375/240.25; 375/240.18; 375/265; 375/262

(58) Field of Classification Search ............. 375/240.03, 375/240.18, 240.23, 240.25, 262, 265
See application file for complete search history.

(56) References Cited

U.S. PATENT DOCUMENTS

| 6,646,578 | B1* | 11/2003 | Au ................................ 341/67 |
| 7,135,997 | B2 | 11/2006 | Oh |
| 7,161,509 | B2* | 1/2007 | Naito ............................. 341/67 |
| 2004/0066974 | A1* | 4/2004 | Karczewicz et al. ......... 382/239 |
| 2005/0156761 | A1* | 7/2005 | Oh ................................ 341/67 |
| 2005/0259742 | A1* | 11/2005 | Hellman ................... 375/240.23 |
| 2006/0126743 | A1* | 6/2006 | Takekawa et al. ....... 375/240.23 |
| 2006/0126744 | A1* | 6/2006 | Peng et al. ............... 375/240.26 |

(Continued)

FOREIGN PATENT DOCUMENTS

| JP | 05-062662 A | 3/1993 |
| JP | 10-006453 A | 1/1998 |
| JP | 10-324758 A | 12/1998 |

(Continued)

OTHER PUBLICATIONS

Yong-Hwan Kim et al., Memory-Efficient H.264/AVC CAVLC for Fast Decoding, IEEE Transactions on Consumer Electronics, vol. 52, No. 3, pp. 943-952, Aug. 2006.

*Primary Examiner* — Kwang B Yao
*Assistant Examiner* — Candal Elpenord
(74) *Attorney, Agent, or Firm* — Lerner, David, Littenberg, Krumholz & Mentlik, LLP

(57) ABSTRACT

A decoding method and device for decoding a coefficient data row subjected to orthogonal transform processing in a predetermined coding processing unit from an input bit stream in which using a table selected corresponding to the number of unprocessed coefficient data of a specific value in the coefficient data row, at least a specific syntax element indicating the number of continuous coefficient data of the specific value in the coefficient data row is assigned for every coefficient data which is not the specific value.

8 Claims, 28 Drawing Sheets

U.S. PATENT DOCUMENTS

| | | | |
|---|---|---|---|
| 2007/0071102 A1* | 3/2007 | Wang | 375/240.18 |
| 2007/0120711 A1* | 5/2007 | Hu et al. | 341/50 |
| 2007/0262886 A1* | 11/2007 | Kim et al. | 341/50 |
| 2007/0274392 A1* | 11/2007 | Tseng et al. | 375/240.23 |

FOREIGN PATENT DOCUMENTS

| | | |
|---|---|---|
| JP | 2002-355938 A | 12/2002 |
| JP | 2005-209570 A | 8/2005 |
| JP | 2006-157157 A | 6/2006 |

\* cited by examiner

[FIG. 1]

| SYNTAX ELEMENT NAME | DEFINITION |
|---|---|
| TotalCoeff | TOTAL NUMBER OF NON-ZERO COEFFICIENTS EXISTING IN PROCESSING BLOCK (4×4 OR 2×2) |
| TrailingOnes | NUMBER (THREE OR LESS) OF COEFFICIENTS OF ABSOLUTE VALUE 1 WHICH ARE CONTINUOUS AT THE END IN PROCESSING BLOCK (4×4 OR 2×2) |
| coeff_token | SYNTAX ELEMENT OBTAINED BY COMBINING "TotalCoeff" WITH "TrailingOnes" |
| trailing_ones_sign_flag | SIGNS OF COEFFICIENTS OF ABSOLUTE VALUE 1 WHICH ARE CONTINUOUS AT THE END |
| level_prefix | PREFIX PORTION WHEN COEFFICIENT IS ENCODED |
| level_suffix | SUFFIX PORTION WHEN COEFFICIENT IS ENCODED |
| level | DCT COEFFICIENT VALUE |
| total_zeros | NUMBER OF ZERO COEFFICIENTS BEFORE LAST NON-ZERO COEFFICIENT |
| run_before | NUMBER OF CONTINUOUS ZERO COEFFICIENTS BEFORE NON-ZERO COEFFICIENT |
| zerosLeft | NUMBER OF UNPROCESSED ZERO COEFFICIENTS IN "total_zeros" |

[FIG. 2]
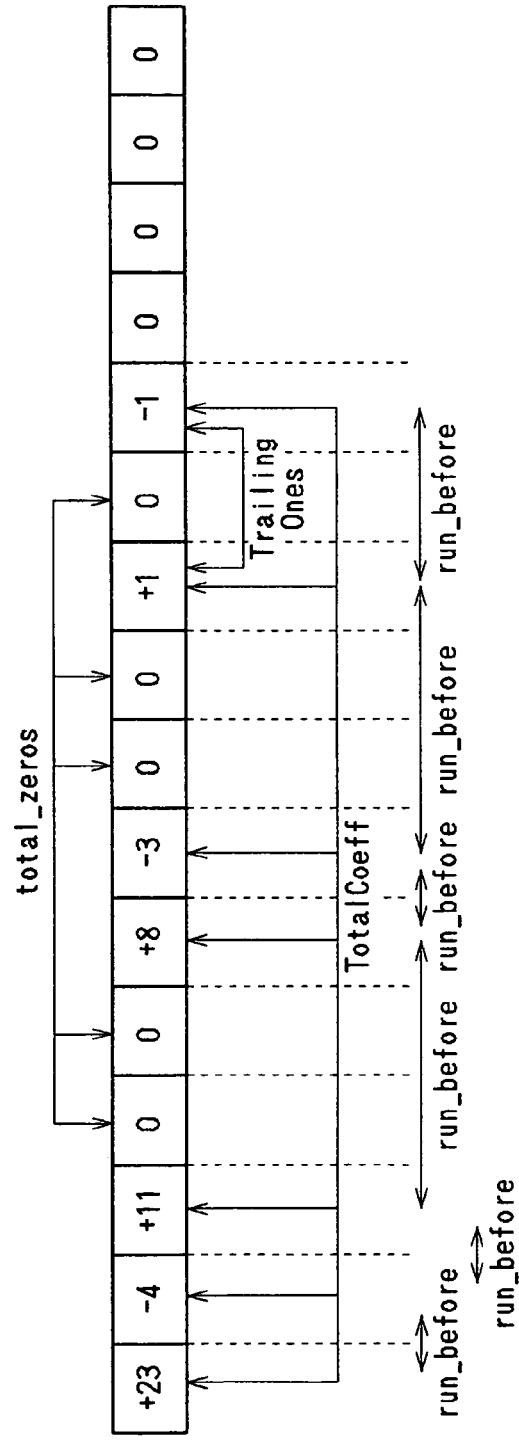

| level 11 | level 0 | level 7 | level 6 |
|---|---|---|---|
| level 10 | level 8 | level 5 | level 0 |
| level 9 | level 4 | level 1 | t1-2 |
| level 3 | level 2 | t1-1 | t1-0 |

(B)

SYNTAX

| coeff token | t1-0 | t1-1 | t1-2 | level0 | level1 | level2 | level3 | level4 | level5 | level6 |
| level7 | level8 | level9 | level10 | level11 | total zeros | run before0 | run before1 | run before2 | run before3 | run before4 |
| run before5 | run before6 | run before7 | run before8 | run before9 | run before10 | run before11 | run before12 | run before13 | | |

[FIG. 4]

| | |
|---|---|
| coeff_token | {2, 7} |
| trailing_ones_sign_flag | – |
| trailing_ones_sign_flag | + |
| level | –3 |
| level | +8 |
| level | +11 |
| level | –4 |
| level | +23 |
| total_zeros | 5 |
| run_before | 1 |
| run_before | 2 |
| run_before | 0 |
| run_before | 2 |
| run_before | 0 |
| run_before | 0 |

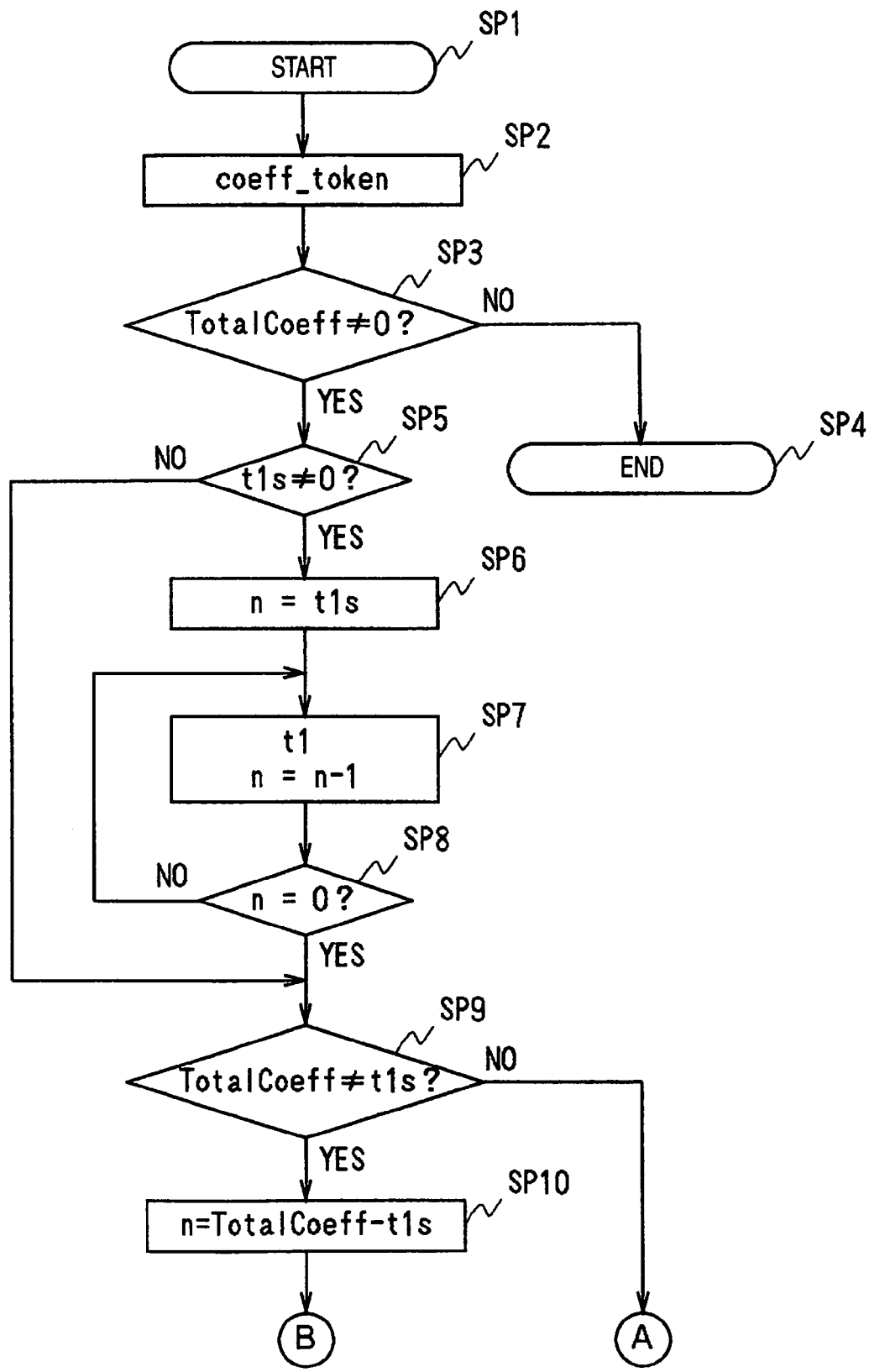
[FIG. 5]

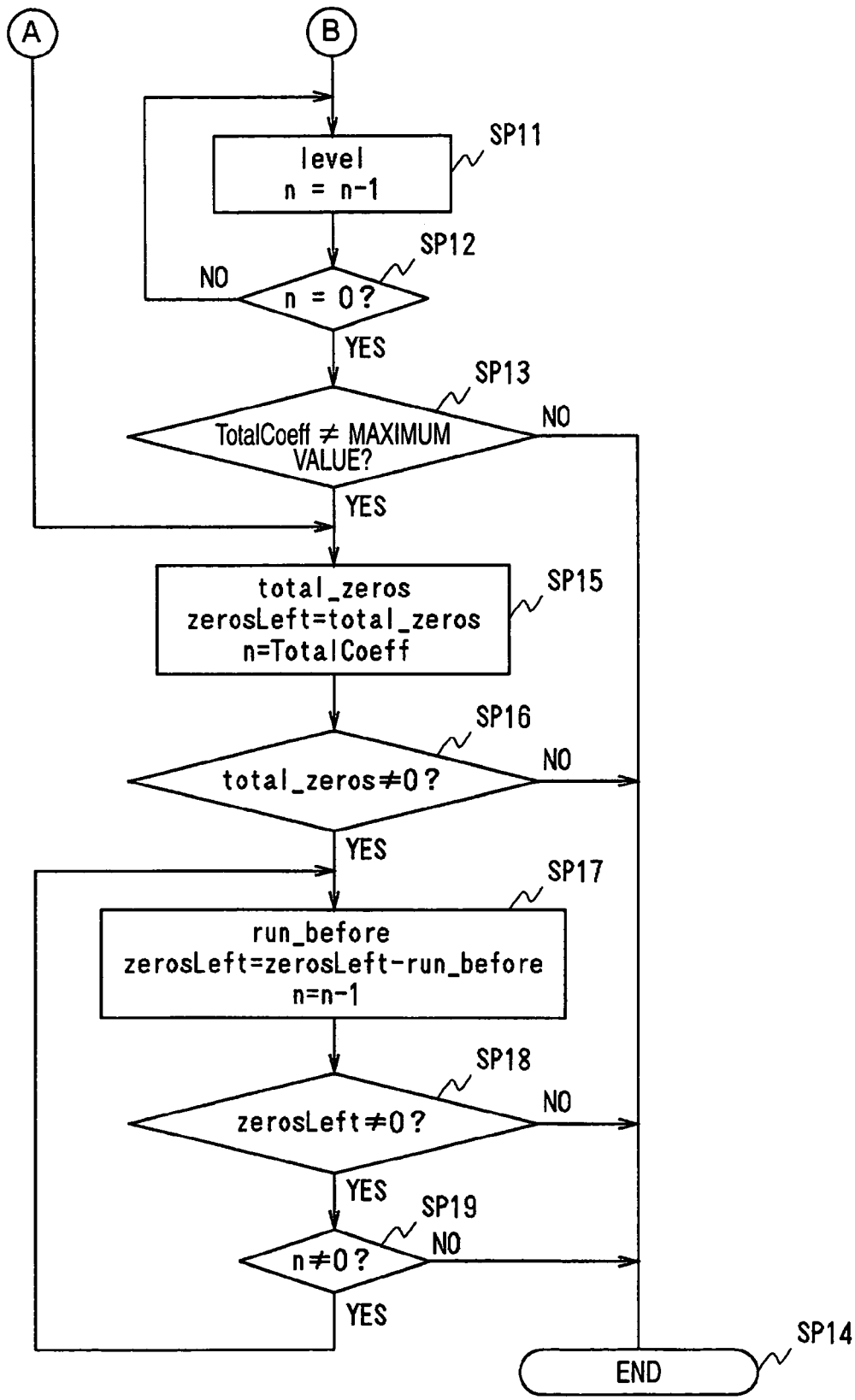
[FIG. 6]

[FIG. 7]

| TrailingOnes (coeff_token) | TotalCoeff (coeff_token) | 0<=nC<2 | 2<=nC<4 | 4<=nC<8 | 8<=nC | nC==-1 |
|---|---|---|---|---|---|---|
| 0 | 0 | 1 | 11 | 1111 | 0000 11 | 01 |
| 0 | 1 | 0001 01 | 0010 11 | 0011 11 | 0000 00 | 0001 11 |
| 1 | 1 | 01 | 10 | 1110 | 0000 01 | 1 |
| 0 | 2 | 0000 0111 | 0001 11 | 0010 11 | 0001 00 | 0001 00 |
| 1 | 2 | 0001 00 | 0011 1 | 0111 1 | 0001 01 | 0001 10 |
| 2 | 2 | 001 | 011 | 1101 | 0001 10 | 001 |
| 0 | 3 | 0000 0011 1 | 0000 111 | 0010 00 | 0010 00 | 0000 11 |
| 1 | 3 | 0000 0110 | 0010 10 | 0110 0 | 0010 01 | 0000 011 |
| 2 | 3 | 0000 101 | 0010 01 | 0111 0 | 0010 10 | 0000 010 |
| 3 | 3 | 0001 1 | 0101 | 1100 | 0010 11 | 0001 01 |
| 0 | 4 | 0000 0001 11 | 0000 0111 | 0001 111 | 0011 00 | 0000 10 |
| 1 | 4 | 0000 0011 0 | 0001 10 | 0101 0 | 0011 01 | 0000 0011 |
| 2 | 4 | 0000 0101 | 0001 01 | 0101 1 | 0011 10 | 0000 0010 |
| 3 | 4 | 0000 11 | 0100 | 1011 | 0011 11 | 0000 000 |
| 0 | 5 | 0000 0000 111 | 0000 0100 | 0001 011 | 0100 00 | - |
| 1 | 5 | 0000 0001 10 | 0000 110 | 0100 0 | 0100 01 | - |
| 2 | 5 | 0000 0010 1 | 0000 101 | 0100 1 | 0100 10 | - |
| 3 | 5 | 0000 100 | 0011 0 | 1010 | 0100 11 | - |

[FIG. 8]

| TrailingOnes (coeff_token) | TotalCoeff (coeff_token) | 0<=nC<2 | 2<=nC<4 | 4<=nC<8 | 8<=nC | nC==-1 |
|---|---|---|---|---|---|---|
| 0 | 6 | 0000 0000 0111 1 | 0000 0011 1 | 0001 001 | 0101 00 | - |
| 1 | 6 | 0000 0000 110 | 0000 0110 | 0011 10 | 0101 01 | - |
| 2 | 6 | 0000 0001 01 | 0000 0101 | 0011 01 | 0101 10 | - |
| 3 | 6 | 0000 0100 | 0010 00 | 1001 | 0101 11 | - |
| 0 | 7 | 0000 0000 0101 1 | 0000 0001 111 | 0001 000 | 0110 00 | - |
| 1 | 7 | 0000 0000 0111 0 | 0000 0011 0 | 0010 10 | 0110 01 | - |
| 2 | 7 | 0000 0000 101 | 0000 0010 1 | 0010 01 | 0110 10 | - |
| 3 | 7 | 0000 0010 0 | 0001 00 | 1000 | 0110 11 | - |
| 0 | 8 | 0000 0000 0100 0 | 0000 0001 011 | 0000 1111 | 0111 00 | - |
| 1 | 8 | 0000 0000 0101 0 | 0000 0001 110 | 0001 110 | 0111 01 | - |
| 2 | 8 | 0000 0000 0110 1 | 0000 0001 101 | 0001 101 | 0111 10 | - |
| 3 | 8 | 0000 0001 00 | 0000 100 | 0110 1 | 0111 11 | - |
| 0 | 9 | 0000 0000 0011 11 | 0000 0000 1111 | 0000 1011 | 1000 00 | - |
| 1 | 9 | 0000 0000 0011 10 | 0000 0001 010 | 0000 1110 | 1000 01 | - |
| 2 | 9 | 0000 0000 0100 1 | 0000 0001 001 | 0001 010 | 1000 10 | - |
| 3 | 9 | 0000 0000 100 | 0000 0010 0 | 0011 00 | 1000 11 | - |
| 0 | 10 | 0000 0000 0010 11 | 0000 0000 1011 | 0000 0111 1 | 1001 00 | - |
| 1 | 10 | 0000 0000 0010 10 | 0000 0000 1110 | 0000 1010 | 1001 01 | - |

[FIG. 9]

| TrailingOnes (coeff_token) | TotalCoeff (coeff_token) | 0<=nC<2 | 2<=nC<4 | 4<=nC<8 | 8<=nC | nC==-1 |
|---|---|---|---|---|---|---|
| 2 | 10 | 0000 0000 0011 01 | 0000 0000 0000 1101 | 0000 1101 | 1001 10 | - |
| 3 | 10 | 0000 0000 0110 0 | 0000 0000 0001 100 | 0001 100 | 1001 11 | - |
| 0 | 11 | 0000 0000 0001 111 | 0000 0000 0000 1000 | 0000 0101 1 | 1010 00 | - |
| 1 | 11 | 0000 0000 0001 110 | 0000 0000 0000 1010 | 0000 0111 0 | 1010 01 | - |
| 2 | 11 | 0000 0000 0010 01 | 0000 0000 0000 1001 | 0000 1001 | 1010 10 | - |
| 3 | 11 | 0000 0000 0011 00 | 0000 0000 0001 000 | 0000 1100 | 1010 11 | - |
| 0 | 12 | 0000 0000 0001 011 | 0000 0000 0000 0111 1 | 0000 0100 0 | 1011 00 | - |
| 1 | 12 | 0000 0000 0001 010 | 0000 0000 0000 0111 0 | 0000 0101 0 | 1011 01 | - |
| 2 | 12 | 0000 0000 0001 101 | 0000 0000 0000 0110 1 | 0000 0110 1 | 1011 10 | - |
| 3 | 12 | 0000 0000 0001 100 | 0000 0000 0000 1100 | 0000 1000 | 1011 11 | - |
| 0 | 13 | 0000 0000 0000 1111 | 0000 0000 0000 0101 1 | 0000 0011 01 | 1100 00 | - |
| 1 | 13 | 0000 0000 0000 001 | 0000 0000 0000 0101 0 | 0000 0011 1 | 1100 01 | - |
| 2 | 13 | 0000 0000 0001 001 | 0000 0000 0000 0100 1 | 0000 0100 1 | 1100 10 | - |
| 3 | 13 | 0000 0000 0001 100 | 0000 0000 0000 0110 0 | 0000 0110 0 | 1100 11 | - |
| 0 | 14 | 0000 0000 0000 1011 | 0000 0000 0000 0011 1 | 0000 0010 01 | 1101 00 | - |
| 1 | 14 | 0000 0000 0000 1110 | 0000 0000 0000 0010 11 | 0000 0011 00 | 1101 01 | - |
| 2 | 14 | 0000 0000 0000 1101 | 0000 0000 0000 0011 0 | 0000 0010 11 | 1101 10 | - |
| 3 | 14 | 0000 0000 0000 1000 | 0000 0000 0000 0100 0 | 0000 0010 10 | 1101 11 | - |

[FIG. 10]

| TrailingOnes (coeff_token) | TotalCoeff (coeff_token) | 0<=nC<2 | 2<=nC<4 | 4<=nC<8 | 8<=nC | nC==-1 |
|---|---|---|---|---|---|---|
| 0 | 15 | 0000 0000 0000 0111 | 0000 0000 0010 01 | 0000 0001 01 | 1110 00 | - |
| 1 | 15 | 0000 0000 0000 1010 | 0000 0000 0010 00 | 0000 0010 00 | 1110 01 | - |
| 2 | 15 | 0000 0000 0000 1001 | 0000 0000 0010 10 | 0000 0001 11 | 1110 10 | - |
| 3 | 15 | 0000 0000 0000 1100 | 0000 0000 0000 1 | 0000 0001 10 | 1110 11 | - |
| 0 | 16 | 0000 0000 0000 0100 | 0000 0000 0001 11 | 0000 0000 01 | 1111 00 | - |
| 1 | 16 | 0000 0000 0000 0110 | 0000 0000 0001 10 | 0000 0001 00 | 1111 01 | - |
| 2 | 16 | 0000 0000 0000 0101 | 0000 0000 0001 01 | 0000 0000 11 | 1111 10 | - |
| 3 | 16 | 0000 0000 0000 1000 | 0000 0000 0001 00 | 0000 0000 10 | 1111 11 | - |

[FIG. 11]

| total_zeros | \ | TotalCoeff(coeff_token) | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| 0 | | 1 | 111 | 0101 | 0001 1 | 0101 | 0000 01 | 0000 01 | 0000 01 | 0000 01 | 0000 1 | 0000 | 0000 | 000 | 00 | 0 |
| 1 | | 011 | 110 | 111 | 111 | 0100 | 0000 1 | 0000 1 | 0001 | 0000 01 | 0000 0 | 0001 | 0001 | 001 | 01 | 1 |
| 2 | | 010 | 101 | 110 | 0101 | 0011 | 111 | 101 | 0000 1 | 0001 | 001 | 001 | 01 | 1 | 1 | |
| 3 | | 0011 | 100 | 101 | 0100 | 111 | 110 | 100 | 011 | 11 | 11 | 010 | 1 | 01 | | |
| 4 | | 0010 | 011 | 0100 | 110 | 110 | 101 | 011 | 11 | 10 | 10 | 1 | 001 | | | |
| 5 | | 0001 1 | 0101 | 0011 | 101 | 101 | 100 | 11 | 10 | 001 | 01 | 011 | | | | |
| 6 | | 0001 0 | 0100 | 100 | 100 | 100 | 011 | 010 | 010 | 01 | 0001 | | | | | |
| 7 | | 0000 11 | 0011 | 011 | 011 | 011 | 010 | 0001 | 001 | 0000 1 | | | | | | |
| 8 | | 0000 10 | 0010 | 0010 | 0010 | 0010 | 0001 | 001 | 0000 00 | | | | | | | |
| 9 | | 0000 011 | 0001 1 | 0001 1 | 0001 0 | 0000 1 | 0000 00 | 0000 00 | | | | | | | | |
| 10 | | 0000 010 | 0001 0 | 0001 0 | 0000 1 | 0000 0 | | | | | | | | | | |
| 11 | | 0000 0011 | 0000 11 | 0000 01 | 0000 1 | | | | | | | | | | | |
| 12 | | 0000 0010 | 0000 10 | 0000 10 | 0000 0 | | | | | | | | | | | |
| 13 | | 0000 0001 1 | 0000 01 | 0000 1 | | | | | | | | | | | | |
| 14 | | 0000 0001 0 | 0000 00 | | | | | | | | | | | | | |
| 15 | | 0000 0000 1 | | | | | | | | | | | | | | |

[FIG. 12]

| total_zeros | TotalCoeff(coeff_token) | | | |
|---|---|---|---|---|
| | 1 | 2 | 3 | |
| 0 | 1 | 111 | 0101 | |
| 1 | 011 | 110 | 111 | |
| 2 | 010 | 101 | 110 | |
| 3 | 0011 | 100 | 101 | |

[FIG. 13]
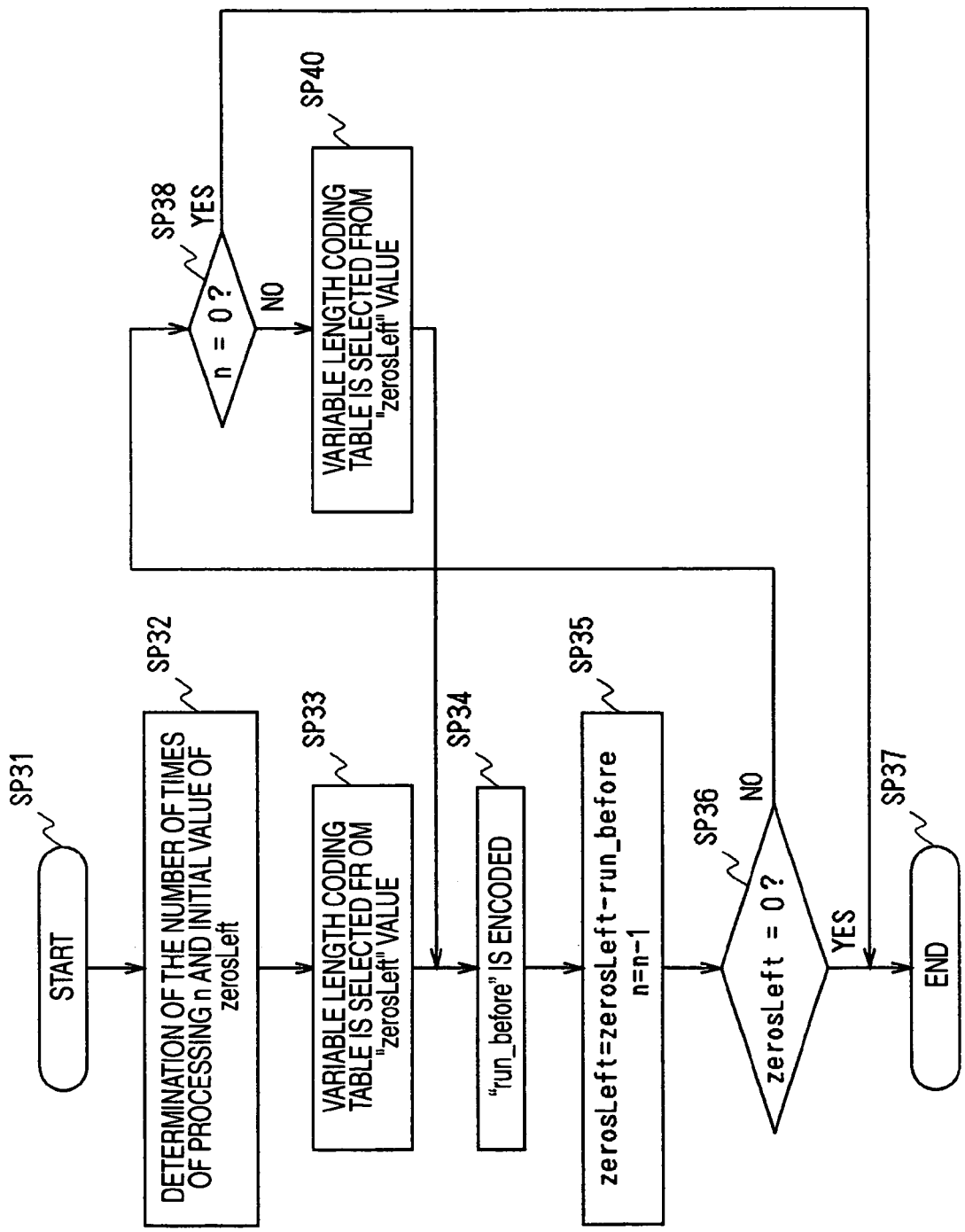

[FIG. 14]

| run_before | zerosLeft | | | | | | |
|---|---|---|---|---|---|---|---|
| | 1 | 2 | 3 | 4 | 5 | 6 | >6 |
| 0 | 1 | 1 | 11 | 11 | 11 | 11 | 111 |
| 1 | 0 | 01 | 10 | 10 | 10 | 000 | 110 |
| 2 | - | 00 | 01 | 01 | 011 | 001 | 101 |
| 3 | - | - | 00 | 001 | 010 | 011 | 100 |
| 4 | - | - | - | 000 | 001 | 010 | 011 |
| 5 | - | - | - | - | 00 | 101 | 010 |
| 6 | - | - | - | - | - | 100 | 001 |
| 7 | - | - | - | - | - | - | 0001 |
| 8 | - | - | - | - | - | - | 0000 1 |
| 9 | - | - | - | - | - | - | 0000 01 |
| 10 | - | - | - | - | - | - | 0000 001 |
| 11 | - | - | - | - | - | - | 0000 0001 |
| 12 | - | - | - | - | - | - | 0000 0000 1 |
| 13 | - | - | - | - | - | - | 0000 0000 01 |
| 14 | - | - | - | - | - | - | 0000 0000 001 |

[FIG. 15]

ENCODING STEP
1) ENCODING OF coeff_token
   (1) "nC" VALUE IS CALCULATED FROM ADJACENT BLOCKS (TOTAL NUMBER OF COEFFICIENTS OF UPPER BLOCK AND LEFT BLOCK) AND VARIABLE LENGTH CODING TABLE TO BE USED IS SELECTED
   (2) {2,7} IS ENCODED TO "0000_0000_101" BY USING VARIABLE LENGTH CODING TABLE SELECTED IN (1)
2) ENCODING OF trailing_ones_sign_flag
   (1) "1" SINCE IT IS "−"
   (2) "0" SINCE IT IS "+"
3) ENCODING OF level
   (1) level "−3" IS ENCODED TO "0001"
   (2) level "+8" IS ENCODED TO "0_0000_0010"
   (3) level "+11" IS ENCODED TO "0000_0100"
   (4) level "−4" IS ENCODED TO "1111"
   (5) level "+23" IS ENCODED TO "0_0000_1100"
4) ENCODING OF "total_zeros"
   (1) "11" SINCE "TotaoCoeff==7" AND "total_zeros==5"
5) ENCODING OF "run_before"
   (1) "zerosLeft" IS SET TO "total_zeros"
   (2) "run_before==1" IS ENCODED ("10") USING TABLE OF "zerosLeft==5"
   (4) "run_before==2" IS ENCODED ("01") USING TABLE OF "zerosLeft==4"
   (6) "run_before==0" IS ENCODED ("1") USING TABLE OF "zerosLeft==2"
   (8) "run_before==2" IS ENCODED ("00") USING TABLE OF "zerosLeft==2"
   (10) PROCESSING ENDS SINCE "zerosLeft==0"

[FIG. 16]

```
DECODING STEP
INPUT STREAM "0000_0000_1011_0000_1000_0000_1000_0001_0011_1100_0001_1001_1100_1100"
1) DECODING OF coeff_token
    (1) "nC" VALUE IS CALCULATED FROM ADJACENT BLOCKS (TOTAL NUMBER OF COEFFICIENTS OF UPPER BLOCK AND LEFT BLOCK) AND
VARIABLE LENGTH CODING TABLE TO BE USED IS SELECTED
    (2) PATTERN MATCHING IS EXECUTED BY USING VARIABLE LENGTH CODING TABLE SELECTED IN (1) "0000_0000_101" -> (2,7)
    (3) INPUT STREAM IS SHIFTED BY 11 BITS USED IN (2)
    INPUT STREAM "1_0000_1000_0000_1000_0001_0011_1100_0001_1001_1100_1100"
2) DECODING OF trailing_ones_sign_flag
    (1) DECODING OF Trailing_ones_sign_flag IS EXECUTED TWICE SINCE "trailingOnes" IS "2" BY 1)-2)
    (2) "-" SINCE IT IS "1"
    (3) "+" SINCE IT IS "0"
    (4) INPUT STREAM IS SHIFTED BY 2 BITS USED IN (2) AND (3)
    INPUT STREAM "000_1000_0000_1000_0001_0011_1100_0001_1001_1100_1100"
3) DECODING OF level (EXECUTED FOR FIVE COEFFICIENTS)
    (1) level "-3" IS DECODED FROM INPUT STREAM "0001"
    INPUT STREAM "000_0000_1000_0001_0011_1100_0001_1001_1100_1100"
    (2) level "+8" IS DECODED FROM INPUT STREAM "0_0000_0010"
    INPUT STREAM "00_0001_0011_1100_0001_1001_1100_1100"
    (3) level "+11" IS DECODED FROM INPUT STREAM "0000_0100"
    INPUT STREAM "11_1100_0001_1001_1100_1100"
    (4) level "-4" IS DECODED FROM INPUT STREAM "1111"
    INPUT STREAM "00_0001_1001_1100_1100"
    (5) level "+11" IS DECODED FROM INPUT STREAM "0_0000_1100"
    INPUT STREAM "1_1100_1100"
4) DECODING OF "total_zeros"
    (1) EXECUTION OF PATTERN MATCHING USING TABLE OF "TotaoCoeff==7" "11"->"total_zeros==5"
    (2) SHIFT OF 2 BITS USING INPUT STREAM
    INPUT STREAM "100_1100"
5) DECODING OF "run_before"
    (1) "zerosLeft" IS SET TO "total_zeros"
    (2) EXECUTION OF PATTERN MATCHING USING TABLE OF "zerosLeft==5" "10"->" run_before==1"
    (4) EXECUTION OF PATTERN MATCHING USING TABLE OF "zerosLeft==4" "01"->" run_before==2"
    (6) EXECUTION OF PATTERN MATCHING USING TABLE OF "zerosLeft==2" "1"->" run_before==0"
    (8) EXECUTION OF PATTERN MATCHING USING TABLE OF "zerosLeft==2" "00"->" run_before==2"
    (10) PROCESSING ENDS SINCE "zerosLeft==0"
```

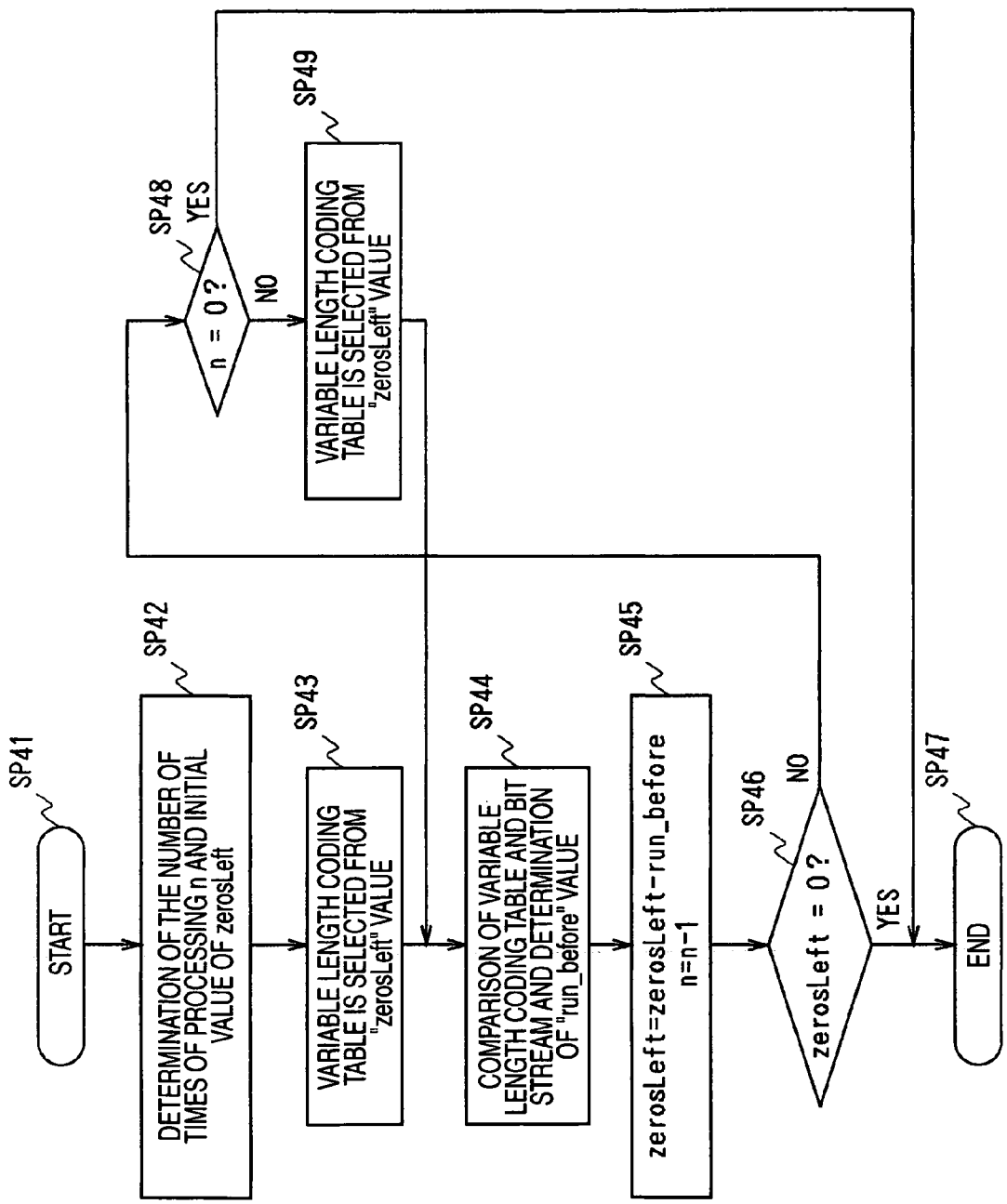
[FIG. 17]

[FIG. 18]
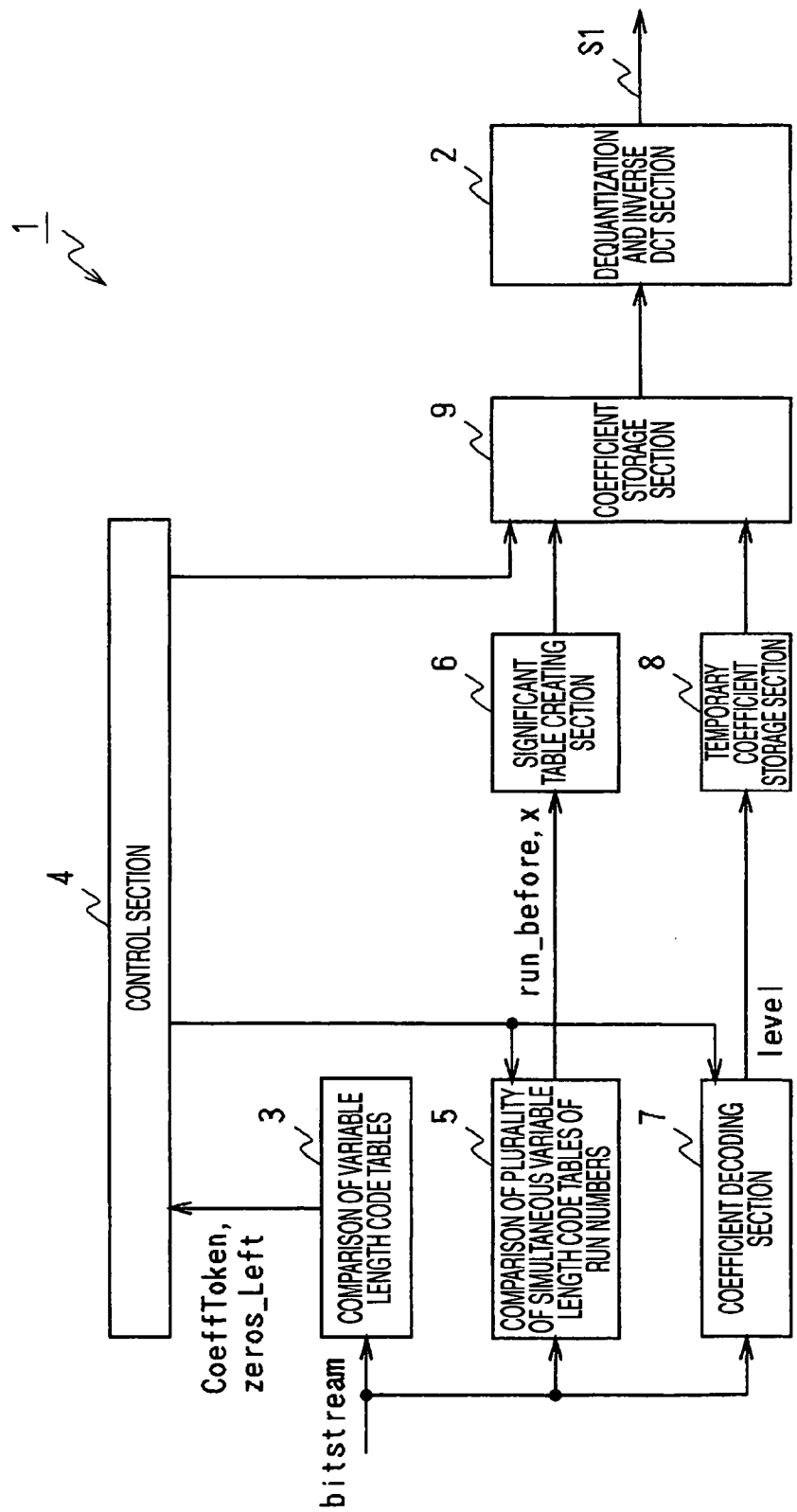

[FIG. 19]

[FIG. 20]
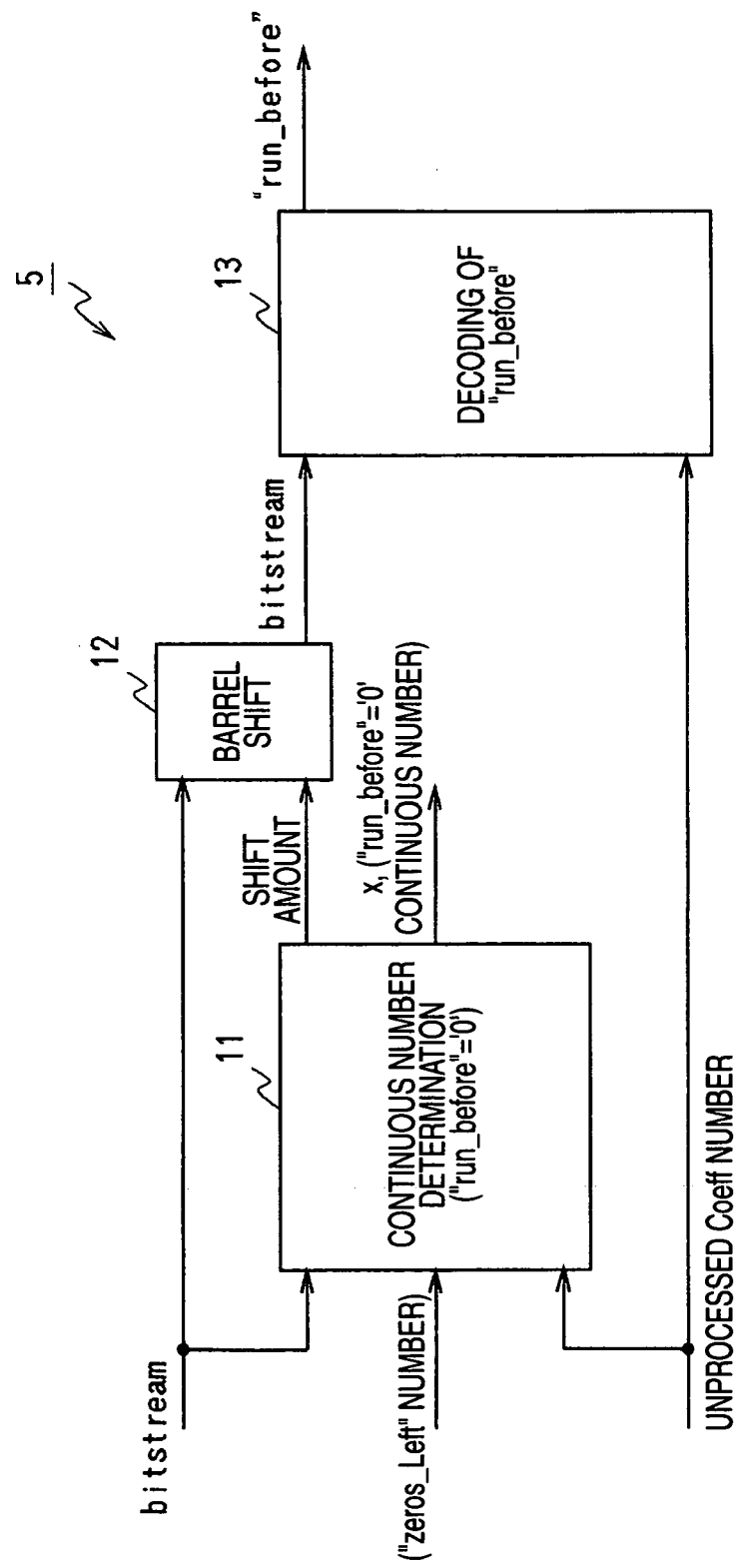

[FIG. 21]

| UNPROCESSED Coeff NUMBER | | | | | | | | | | | | | | | BIT ROW | CONTINUOUS NUMBER OF "run_before"=='0', X | SHIFT AMOUNT |
|---|---|---|---|---|---|---|---|---|---|---|---|---|---|---|---|---|---|
| 2 | O | — | — | — | — | — | — | — | — | — | — | — | — | — | 1 | 1 | 1 |
| 3 | O | O | — | — | — | — | — | — | — | — | — | — | — | — | 11 | 2 | 2 |
| 4 | O | O | O | — | — | — | — | — | — | — | — | — | — | — | 111 | 3 | 3 |
| 5 | O | O | O | O | — | — | — | — | — | — | — | — | — | — | 1111 | 4 | 4 |
| 6 | O | O | O | O | O | — | — | — | — | — | — | — | — | — | 11111 | 5 | 5 |
| 7 | O | O | O | O | O | O | — | — | — | — | — | — | — | — | 111111 | 6 | 6 |
| 8 | O | O | O | O | O | O | O | — | — | — | — | — | — | — | 1111111 | 7 | 7 |
| 9 | O | O | O | O | O | O | O | O | — | — | — | — | — | — | 11111111 | 8 | 8 |
| 10 | O | O | O | O | O | O | O | O | O | — | — | — | — | — | 111111111 | 9 | 9 |
| 11 | O | O | O | O | O | O | O | O | O | O | — | — | — | — | 1111111111 | 10 | 10 |
| 12 | O | O | O | O | O | O | O | O | O | O | O | — | — | — | 11111111111 | 11 | 11 |
| 13 | O | O | O | O | O | O | O | O | O | O | O | O | — | — | 111111111111 | 12 | 12 |
| 14 | O | O | O | O | O | O | O | O | O | O | O | O | O | — | 1111111111111 | 13 | 13 |
| 15 | O | O | O | O | O | O | O | O | O | O | O | O | O | O | 11111111111111 | 14 | 14 |

("zerosLeft" IS '1' OR '2')

[FIG. 22]

| USED RANGE UNPROCESSED Coeff NUMBER | | | | | | | | | | | BIT ROW | CONTINUOUS NUMBER OF "run_before"=='0', X | SHIFT AMOUNT |
|---|---|---|---|---|---|---|---|---|---|---|---|---|---|
| 2 | 3 | 4 | 5 | 6 | 7 | 8 | 9 | 10 | 11 | 12 | | | |
| ○ | — | — | — | — | — | — | — | — | — | — | 11 | 1 | 2 |
| ○ | ○ | — | — | — | — | — | — | — | — | — | 1111 | 2 | 4 |
| ○ | ○ | ○ | — | — | — | — | — | — | — | — | 111111 | 3 | 6 |
| ○ | ○ | ○ | ○ | — | — | — | — | — | — | — | 11111111 | 4 | 8 |
| ○ | ○ | ○ | ○ | ○ | — | — | — | — | — | — | 1111111111 | 5 | 10 |
| ○ | ○ | ○ | ○ | ○ | ○ | — | — | — | — | — | 111111111111 | 6 | 12 |
| ○ | ○ | ○ | ○ | ○ | ○ | ○ | — | — | — | — | 11111111111111 | 7 | 14 |
| ○ | ○ | ○ | ○ | ○ | ○ | ○ | ○ | — | — | — | 1111111111111111 | 8 | 16 |
| ○ | ○ | ○ | ○ | ○ | ○ | ○ | ○ | ○ | — | — | 111111111111111111 | 9 | 18 |
| ○ | ○ | ○ | ○ | ○ | ○ | ○ | ○ | ○ | ○ | — | 11111111111111111111 | 10 | 20 |
| ○ | ○ | ○ | ○ | ○ | ○ | ○ | ○ | ○ | ○ | ○ | 1111111111111111111111 | 11 | 22 |

("zerosLeft" IS 3', 4', 5', AND 6')

[FIG. 23]

| USED RANGE | | | | | | | | BIT ROW | CONTINUOUS NUMBER OF "run_before"=='0', X | SHIFT AMOUNT |
|---|---|---|---|---|---|---|---|---|---|---|
| UNPROCESSED Coeff NUMBER | | | | | | | | | | |
| 2 | 3 | 4 | 5 | 6 | 7 | 8 | | | | |
| ○ | ○ | ○ | ○ | ○ | ○ | ○ | | 111 | 1 | 3 |
| — | ○ | ○ | ○ | ○ | ○ | ○ | | 111111 | 2 | 6 |
| — | — | ○ | ○ | ○ | ○ | ○ | | 111111111 | 3 | 9 |
| — | — | — | ○ | ○ | ○ | ○ | | 111111111111 | 4 | 12 |
| — | — | — | — | ○ | ○ | ○ | | 111111111111111 | 5 | 15 |
| — | — | — | — | — | ○ | ○ | | 111111111111111111 | 6 | 18 |
| — | — | — | — | — | — | ○ | | 111111111111111111111 | 7 | 21 |

("zerosLeft" IS '7' OR MORE)

[FIG. 24]

| run_before | zerosLeft | | | | | | |
|---|---|---|---|---|---|---|---|
| | 1 | 2 | 3 | 4 | 5 | 6 | >6 |
| 1 | 0 | 01 | 10 | 10 | 10 | 000 | 110 |
| 2 | - | 00 | 01 | 01 | 011 | 001 | 101 |
| 3 | - | - | 00 | 001 | 010 | 011 | 100 |
| 4 | - | - | - | 000 | 001 | 010 | 011 |
| 5 | - | - | - | - | 000 | 101 | 010 |
| 6 | - | - | - | - | - | 100 | 001 |
| 7 | - | - | - | - | - | - | 0001 |
| 8 | - | - | - | - | - | - | 0000 1 |
| 9 | - | - | - | - | - | - | 0000 01 |
| 10 | - | - | - | - | - | - | 0000 001 |
| 11 | - | - | - | - | - | - | 0000 0001 |
| 12 | - | - | - | - | - | - | 0000 0000 1 |
| 13 | - | - | - | - | - | - | 0000 0000 01 |
| 14 | - | - | - | - | - | - | 0000 0000 001 |

[FIG. 25]
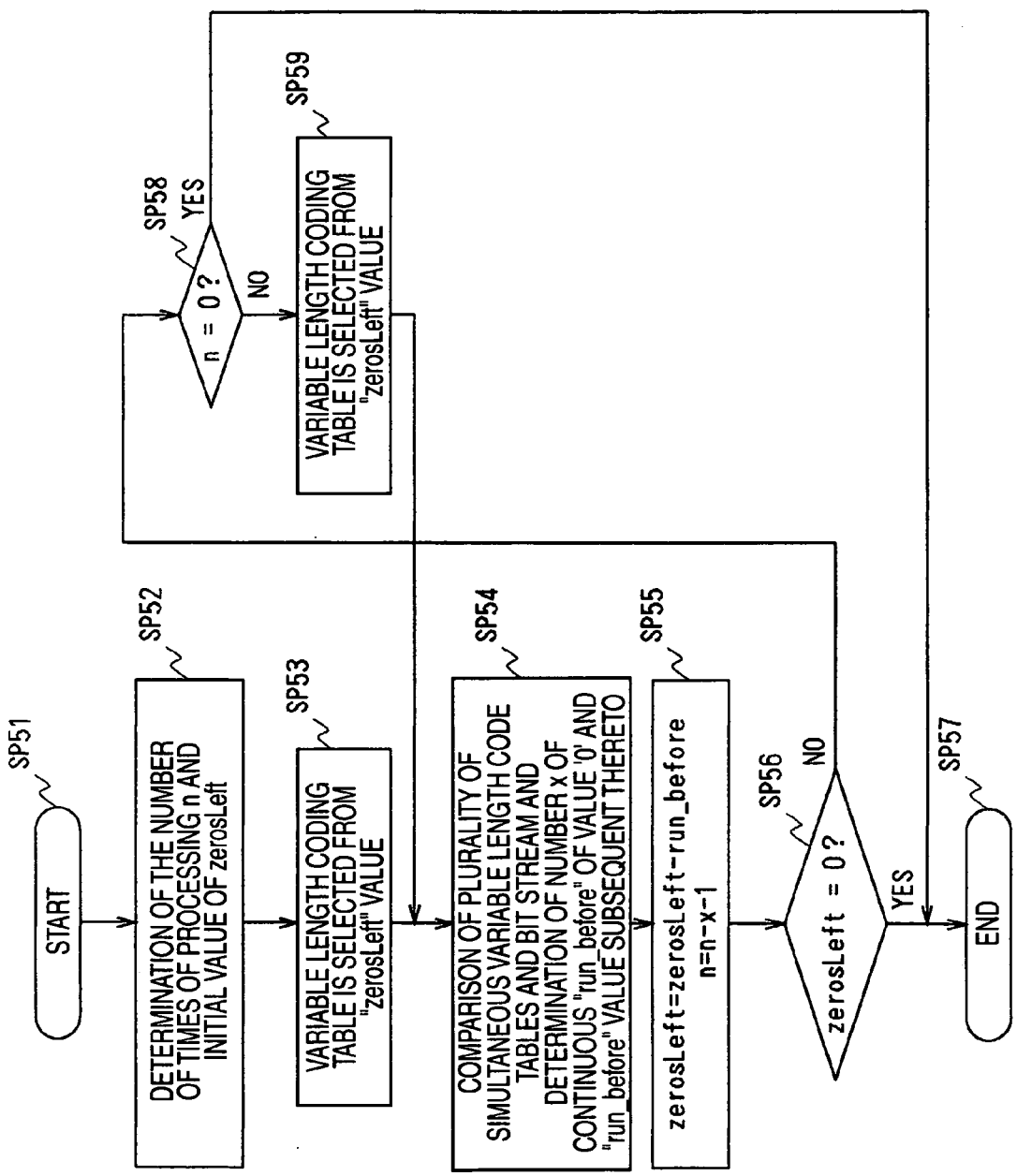

[FIG. 26]
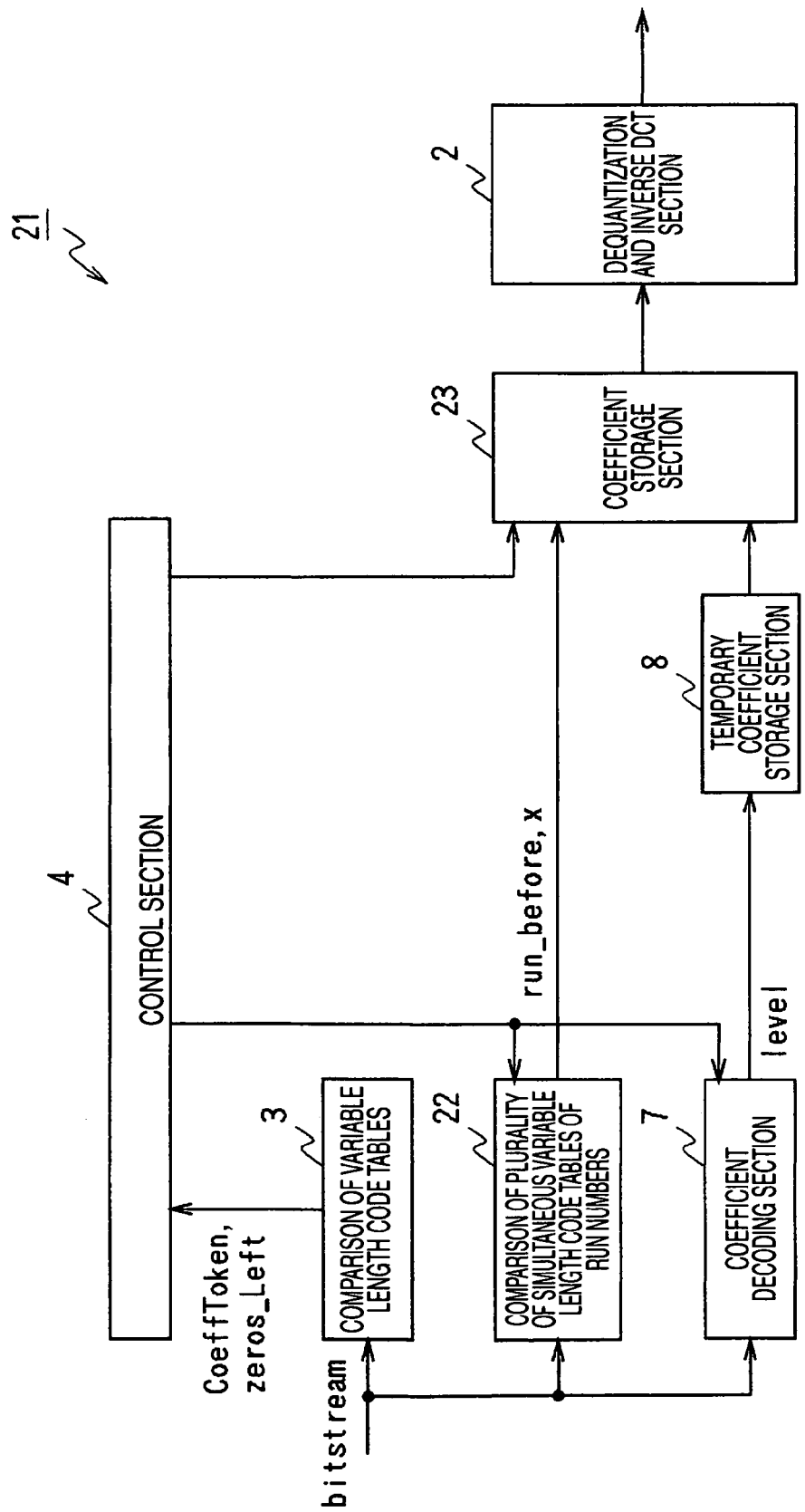

[FIG. 27]

| USED RANGE / UNPROCESSED Coeff NUMBER | | | | | | | | | | | | | | | BIT ROW | CONTINUOUS NUMBER OF "run_before"=='0', X | SHIFT AMOUNT |
|---|---|---|---|---|---|---|---|---|---|---|---|---|---|---|---|---|---|
| 2 | 3 | 4 | 5 | 6 | 7 | 8 | 9 | 10 | 11 | 12 | 13 | 14 | 15 | | | | |
| ○ | ○ | ○ | ○ | ○ | ○ | ○ | ○ | ○ | ○ | ○ | ○ | ○ | ○ | 1 | 1 | 1 |
| – | ○ | ○ | ○ | ○ | ○ | ○ | ○ | ○ | ○ | ○ | ○ | ○ | ○ | 11 | 2 | 2 |
| – | – | ○ | ○ | ○ | ○ | ○ | ○ | ○ | ○ | ○ | ○ | ○ | ○ | 111 | 3 | 3 |
| – | – | – | ○ | ○ | ○ | ○ | ○ | ○ | ○ | ○ | ○ | ○ | ○ | 1111 | 4 | 4 |
| – | – | – | – | ○ | ○ | ○ | ○ | ○ | ○ | ○ | ○ | ○ | ○ | 11111 | 5 | 5 |
| – | – | – | – | – | ○ | ○ | ○ | ○ | ○ | ○ | ○ | ○ | ○ | 111111 | 6 | 6 |
| – | – | – | – | – | – | ○ | ○ | ○ | ○ | ○ | ○ | ○ | ○ | 1111111 | 7 | 7 |
| – | – | – | – | – | – | – | ○ | ○ | ○ | ○ | ○ | ○ | ○ | 11111111 | 8 | 8 |
| – | – | – | – | – | – | – | – | ○ | ○ | ○ | ○ | ○ | ○ | 111111111 | 9 | 9 |
| – | – | – | – | – | – | – | – | – | ○ | ○ | ○ | ○ | ○ | 1111111111 | 10 | 10 |
| – | – | – | – | – | – | – | – | – | – | ○ | ○ | ○ | ○ | 11111111111 | 11 | 11 |
| – | – | – | – | – | – | – | – | – | – | – | ○ | ○ | ○ | 111111111111 | 12 | 12 |
| – | – | – | – | – | – | – | – | – | – | – | – | ○ | ○ | 1111111111111 | 13 | 13 |
| – | – | – | – | – | – | – | – | – | – | – | – | – | ○ | 11111111111111 | 14 | 14 |

("run_before" SYNTAX ELEMENT IS 1")

[FIG. 28]

| USED RANGE UNPROCESSED Coeff NUMBER | | | | | | | | | | | | | | | BIT ROW | CONTINUOUS NUMBER OF "run_before"=='0', X | SHIFT AMOUNT |
|---|---|---|---|---|---|---|---|---|---|---|---|---|---|---|---|---|---|
| 2 | 3 | 4 | 5 | 6 | 7 | 8 | 9 | 10 | 11 | 12 | 13 | 14 | 15 | | | | |
| ○ | ○ | ○ | ○ | ○ | ○ | ○ | ○ | ○ | ○ | ○ | ○ | ○ | ○ | 0 | 0 | 1 |
| - | ○ | ○ | ○ | ○ | ○ | ○ | ○ | ○ | ○ | ○ | ○ | ○ | ○ | 10 | 1 | 1 |
| - | - | ○ | ○ | ○ | ○ | ○ | ○ | ○ | ○ | ○ | ○ | ○ | ○ | 110 | 2 | 1 |
| - | - | - | ○ | ○ | ○ | ○ | ○ | ○ | ○ | ○ | ○ | ○ | ○ | 1110 | 3 | 1 |
| - | - | - | - | ○ | ○ | ○ | ○ | ○ | ○ | ○ | ○ | ○ | ○ | 11110 | 4 | 1 |
| - | - | - | - | - | ○ | ○ | ○ | ○ | ○ | ○ | ○ | ○ | ○ | 111110 | 5 | 1 |
| - | - | - | - | - | - | ○ | ○ | ○ | ○ | ○ | ○ | ○ | ○ | 1111110 | 6 | 1 |
| - | - | - | - | - | - | - | ○ | ○ | ○ | ○ | ○ | ○ | ○ | 11111110 | 7 | 1 |
| - | - | - | - | - | - | - | - | ○ | ○ | ○ | ○ | ○ | ○ | 111111110 | 8 | 1 |
| - | - | - | - | - | - | - | - | - | ○ | ○ | ○ | ○ | ○ | 1111111110 | 9 | 1 |
| - | - | - | - | - | - | - | - | - | - | ○ | ○ | ○ | ○ | 11111111110 | 10 | 1 |
| - | - | - | - | - | - | - | - | - | - | - | ○ | ○ | ○ | 111111111110 | 11 | 1 |
| - | - | - | - | - | - | - | - | - | - | - | - | ○ | ○ | 1111111111110 | 12 | 1 |
| - | - | - | - | - | - | - | - | - | - | - | - | - | ○ | 11111111111110 | 13 | 1 |

("run_before" SYNTAX ELEMENT IS 1')

DECODING METHOD, PROGRAM FOR DECODING METHOD, RECORDING MEDIUM WITH RECORDED PROGRAM FOR DECODING METHOD, AND DECODING DEVICE

CROSS-REFERENCE TO RELATED APPLICATIONS

The present application is a national phase entry under 35 U.S.C. §371 of International Application No. PCT/JP2007/062834 filed Jun. 20, 2007, published on Jan. 31, 2008 as WO 2008/013020 A1, and which claims priority from Japanese Patent Application No. JP 2006-202973 filed in the Japanese Patent Office on Jul. 26, 2006, which are incorporated herein by reference.

BACKGROUND OF THE INVENTION

1. Technical Field

The present invention relates to a decoding method, a program for a decoding method, a recording medium with a recorded program for a decoding method, and a decoding device and may be applied to a decoder based on the ITU (International Telecommunication Union)-T H.264 method, for example. The present invention increases the speed of decoding processing compared with that in the related art by detecting continuous numbers of a syntax element of a specific value, such as a value of 0, and decoding the syntax element on the basis of the detection result.

2. Background Art

Conventionally, in coding processing, such as MPEG (Moving Picture Experts Group)-2 and MPEG-4, orthogonal transform processing of image data is performed in a predetermined coding processing unit and variable length coding processing of coefficient data obtained as a result is performed. Furthermore, in the variable length coding processing, variable length coding data is generated with reference to a variable length code table for every code word, which is obtained by combination of the length (run) of continuous coefficients of a value 0 and coefficient values of subsequent coefficient data which is not the value 0, in a coefficient data row obtained in order of zigzag scan.

Regarding the coding processing, Japanese Patent Application Publication No. 2002-76908 proposes a study for increasing the processing speed by processing a run length and a coefficient value which is not a value 0 simultaneously and in parallel.

On the other hand, in CAVLC (Context Adaptive Variable Length Coding) processing based on the ITU-T H.264 method, variable length coding processing of the run number and the coefficient value which is not a value 0 is performed individually. More specifically, in the CAVLC processing based on the ITU-T H.264 method, adaptive variable length coding processing of the coefficient value which is not a value 0 is performed. In addition, one variable length coding table is selected from a plurality of variable length coding tables according to the total number of unprocessed run numbers and coding processing of the run number is performed with the selected variable length coding table.

Here, FIG. 1 is a chart showing syntax elements in CAVLC processing based on the ITU-T H.264 method. Moreover, hereinbelow, regarding each syntax element, for example, a syntax element of TotalCoeff is described as TotalCoeff and description of a syntax element is omitted. In these syntax elements, the TotalCoeff is the number of coefficients (hereinafter, referred to as non-zero coefficients) which exist in a processing block to be encoded and are not the value 0. Therefore, in the case where coefficient data is calculated as shown in FIG. 2A, when a coefficient data row scanned in a zigzag manner from a low order side is shown in FIG. 2B, seven coefficient data of values +23, −4, +11, +8, −3, +1, and −1 are targets of the TotalCoeff. Accordingly, the TotalCoeff becomes a value 7. Furthermore, here, FIG. 2A is a view showing coefficient data obtained by performing orthogonal transform processing of a processing block of 4×4 pixels, in which a number indicates a coefficient value and an arrow indicates zigzag scan from a low order side to a high order side. In addition, FIG. 2B is a table in which the coefficient values of FIG. 2A are arranged in the scan order.

TrailingOnes is the number of coefficients of an absolute value 1 which are continuous at the end of a processing block. In addition, when the number of coefficients of the absolute value 1 is three or more, the TrailingOnes becomes 3. In addition, a coefficient of a value 0 included in the middle is neglected. Therefore, in the example of FIG. 2A, as shown in FIG. 2B, coefficient data of values of +1 and −1 among coefficient data that is continuous in values +1, 0, and −1 is expressed as the TrailingOnes. In this case, the TrailingOnes becomes a value 2.

A coeff token is a syntax element obtained by combining TotalCoeff with TrailingOnes and is expressed as [2, 7] in the example of FIG. 2B.

A trailing ones sign flag denotes signs of coefficients of an absolute value 1 which are continuous at the end. Therefore, targets of the trailing ones sign flag are coefficient values expressed as the TrailingOnes. In the example of FIG. 2B, since coefficient data of values +1 and −1 among the coefficient data which are continuous in +1, 0, and −1 is expressed as the TrailingOnes, signs of the coefficient data of the values +1 and −1 are expressed as the trailing ones sign flag in this case. For the trailing ones sign flag, + and − are expressed as 0 and 1 from a high order side, respectively.

A level prefix is a prefix portion when a coefficient is encoded, and a level suffix is a suffix portion when a coefficient is encoded. A level is a DCT coefficient value, and coefficient data of an absolute value 1 defined as the trailing ones sign flag and coefficient data of a value 0 are excluded.

A total zeros is the total number of zero coefficients and is the number of zero coefficients before a last non-zero coefficient. Accordingly, in the example of FIG. 2, the total zeros becomes a value 5.

A run before is the number of continuous zero coefficients before each non-zero coefficient when a coefficient data row is viewed from the high order side. Therefore, in the example of FIG. 2, since seven coefficient data of values +23, −4, +11, +8, −3, +1, and −1 is non-zero coefficients and the coefficient data of value −1 is a non-zero coefficient located at the head on the high order side, values of the run before become 1, 2, 0, 2, 0, and 0 for coefficient data of values −1, +1, −3, +8, +11, −4, and +23, respectively, as shown in FIG. 2B.

A zerosLeft is the number of unprocessed zero coefficients in total zeros. Therefore, in the example of FIG. 2B, in the case when coefficient data of a value −1 is an object to be processed, the zerosLeft becomes a value 5.

In the CAVLC processing based on the ITU-T H.264 method, each syntax element defined in FIG. 1 is stored in a bit stream in the sequence shown in FIG. 3. Furthermore, here, FIG. 3A shows coefficient data based on orthogonal transform processing, level11 to level0 are coefficient data defined as level, and 0 is coefficient data of a value 0. Furthermore, t1-2 to t1-0 is coefficient data defined as the trailing ones sign flag.

That is, in the bit stream, the coeff token is first assigned and the trailing ones sign flag is subsequently assigned sequentially from the high order side. Furthermore, the level is assigned continuously from the high order side and total zeros are assigned. Furthermore, the run before is assigned continuously from the high order side.

Therefore, in the example of FIG. 2, syntax elements of coeff token [2, 7], trailing ones sign flag −, trailing ones sign flag +, level −3, level +8, level +11, level −4, level +23, total zeros 5, run before 1, run before 2, run before 0, and run before 2 are sequentially stored in a bit stream as shown in FIG. 4. Here, the zerosLeft becomes 0 by processing the run before 2 on a value +8 and processing of run before on coefficient data of a value +11 and a value −4 is not performed.

In the CAVLC processing, corresponding to the storage sequence of syntax elements, processing procedures shown in FIGS. 5 and 6 are executed for every coding processing unit to thereby perform coding processing of each syntax element.

That is, in the coding processing of CAVLC, a movement from step SP1 to step SP2 is made to perform coding processing of the coeff token. Here, in the coding processing, a selection reference value nC of a variable length coding table is calculated from coding processing blocks adjacent to the start end side of raster scan. In addition, the coding processing blocks adjacent to the start end side of raster scan herein are coding processing blocks on immediately above and left sides. Furthermore, the selection reference value nC is an average value of DCT coefficients in the two coding processing blocks, for example. In the coding processing, one variable length coding table is selected from a plurality of variable length coding tables for execution of coding processing of coeff token corresponding to the selection reference value nC, and coding processing of the coeff token is performed based on the selected variable length coding table.

In addition, here, a variable length coding table for execution of coding processing of the coeff token is shown in FIGS. 7 to 10. Five tables in cases where the selection reference value nC is equal to or larger than a value 0 and less than a value 2, the selection reference value nC is equal to or larger than the value 2 and less than a value 4, the selection reference value nC is equal to or larger than the value 4 and less than a value 8, the selection reference value nC is equal to or larger than the value 8, and the selection reference value nC is value −1 are prepared for the coeff token. Therefore, the coeff token [2, 7] in the example of FIG. 2 is encoded to '0000 0000 101', '0000 0010 1', '0010 01', or '0110 10' on the seventh row from above in FIG. 8 corresponding to the selection reference value nC. Accordingly, for example, in the case where the selection reference value nC is equal to or larger than the value 0 and less than the value 2, the coeff token [2, 7] is encoded to '0000 0000 101'.

Then, the coding processing moves to step SP3 to check whether or not the total number TotalCoeff of coefficient data is 0. In addition, here, when the total number TotalCoeff of coefficient data is 0, the process moves from step SP3 to step SP4 to complete the processing of the coding block.

On the other hand, when the total number TotalCoeff of coefficient data is not 0, the process moves from step SP3 to step SP5. In step SP5, the coding processing checks that there is no TrailingOnes as a value 0 and the process moves from step SP5 to step SP6.

In step SP6, a value t1s of TrailingOnes is set to a count value n that counts the number of times of processing of trailing ones sign flag. In addition, in subsequent step SP7, a sign of coefficient data (in this case, highest-order coefficient data set as TrailingOnes) specified by the count value n among the coefficient data set as the TrailingOnes is determined and the trailing ones sign flag is set. Furthermore, the count value n is decremented only by the value 1, and in a subsequent step SP8, it is determined whether or not all setting of the trailing ones sign flag has been completed by determination of the count value. Here, when a negative result is obtained, the coding processing returns to step SP7 to set the subsequent trailing ones sign flag. On the other hand, when all setting of the trailing ones sign flag is completed, the process moves from step SP8 to step SP9. In addition, when it is checked that the TrailingOnes is a value 0 in step SP5, the process directly moves from step SP5 to step SP9.

Therefore, in the processing shown in FIG. 5, processing of step SP7 is executed corresponding to the number of trailing ones sign flag. In the example of FIG. 2B, two trailing ones sign flag are encoded to '10'.

In subsequent step SP9, the coding processing checks whether or not the value of TotalCoeff does not match the value of TrailingOnes. Here, when it is checked that the value of TotalCoeff does not match the value of TrailingOnes, the coding processing moves to step SP10 in which the value of TrailingOnes is subtracted from the value of TotalCoeff and the number of non-zero coefficients which are not set to trailing ones sign flag is calculated. Furthermore, the calculated value is set to a count value n that counts the number of times of processing of non-zero coefficients.

Subsequently, the coding processing moves to step SP11 and the level of the non-zero coefficient specified by the count value n is context-calculated for coding processing. Furthermore, the count value n is decremented only by the value 1, and in subsequent step SP12, it is determined whether or not all levels of the non-zero coefficients were processed by determination of the count value n. Here, when a negative result is obtained, the coding processing returns to step SP11 to perform coding processing of a level of a subsequent non-zero coefficient. On the other hand, when all levels of the non-zero coefficients are processed, the process moves from step SP12 to step SP13.

In step SP13, it is checked whether or not the TotalCoeff is a maximum value of values which can be taken. Here, when the TotalCoeff is a maximum value of values which can be taken, the process moves from step SP13 to step SP14 to complete the processing procedure since coding processing of all coefficient data has already been completed. On the other hand, when it is checked that the TotalCoeff is not a maximum value of values which can be taken, the process moves from step SP13 to step SP15. In addition, when it is checked that the value of the TotalCoeff matches the value of the TrailingOnes in step SP9, the process directly moves from step SP9 to step SP15.

Therefore, in the coding processing, the levels of non-zero coefficients are decoded by executing the processing in step SP11 as much as a number corresponding to the value of the TotalCoeff. In the example of FIG. 2B, levels of −3, +8, +11, −4, and +23 are sequentially processed to generate a coded data row of '0001 0000 0001 0000 0010 0111 1000 0011 00'.

In subsequent step SP15, coding processing performs coding processing of total zeros using a coding table. Here, variable length coding tables for execution of coding processing of total zeros prepared in the coding processing unit of 4×4 blocks and 2×2 blocks are shown in FIGS. 11 and 12, respectively. In the total zeros, a table is prepared corresponding to each value of TotalCoeff. Accordingly, the coding processing selects a table according to the value of TotalCoeff and performs coding processing of the total zeros using the selected table. Therefore, the value 5 of total zeros in the example of FIG. 2B is encoded to '11' since the TotalCoeff is a value 7.

In addition, subsequently, the value of total zeros is set to an initial value of zerosLeft. In addition, the value of TotalCoeff is set to the count value n which counts the number of times of processing of zerosLeft. Then, the process moves to step SP16 to check whether or not the value of total zeros is 0. When the value of total zeros is 0, the process moves from step SP16 to step SP14 to complete the processing procedure. On the other hand, when the value of total zeros is not 0, the process moves from step SP16 to step SP17.

In this step SP17, in the coding processing, coding processing of run before of a non-zero coefficient (in this case, a non-zero coefficient on the highest-order side) specified by the count value n indicating the number of times of processing is performed to update the zerosLeft and the count value n. In addition, in subsequent step SP18, the zerosLeft is determined to determine whether or not there is unprocessed run before. When a negative result is obtained herein, the process moves from step SP18 to step SP14 to complete the processing procedure. On the other hand, when a positive result is obtained in step SP18, the process moves from step SP18 to step SP19 to determine whether or not there is run before of unprocessed coefficient processing by determination of the count value n. When a negative result is obtained herein, the process moves from step SP19 to step SP14 to complete the processing procedure. On the other hand, when a positive result is obtained in step SP19, the process moves from step SP19 to step SP17 to continuously perform coding processing of run before.

Here, FIG. 13 is a flow chart showing processing procedures of coding processing of syntax elements of run before. In addition, the processing procedures of FIG. 13 show the processing procedures of steps SP17-SP18-SP19-SP17 of FIG. 6 in detail. Accordingly, it is needless to say that some of the following description overlaps descriptions of FIGS. 5 and 6.

When the processing procedures start, the coding processing moves from step SP31 to step SP32 to set TotalCoeff to the count value n indicating the number of times of processing. In addition, total zeros are set to an initial value of zerosLeft which is the number of unprocessed zero coefficients.

In addition, in subsequent step SP33, a table which performs coding processing of the run before with the value of zerosLeft is selected. Here, a table which performs coding processing of the run before is shown in FIG. 14. Seven tables in cases where the value of zerosLeft which is the number of unprocessed zero coefficients is a value 1, the value of zerosLeft is a value 2, the value of zerosLeft is a value 3, the value of zerosLeft is a value 4, the value of zerosLeft is a value 5, the value of zerosLeft is a value 6, and the value of zerosLeft is larger than a value 6 are prepared for the run before, and a table used for coding processing is selected according to the value of zerosLeft. Here, in the case of FIG. 2B, the total zeros are 5. Accordingly, in this case, a table in which the total zeros are the value 5 is selected.

Then, the coding processing moves to step SP34 in which coding processing of the run before specified by the count value n is performed by using the table selected in step SP33. Therefore, in the example of FIG. 2B, the run before of a value 1 which is the number of continuous zero coefficients immediately before a coefficient of −1, which is located at the fifth coefficient from the high order side, is encoded to '10'.

Then, the CAVLC processing moves to step SP35 in which the value of run before encoded in the last step SP34 is subtracted from the value of zerosLeft and the value of zerosLeft which is the number of unprocessed zero coefficients is updated. In addition, a value 1 is subtracted from the count value n indicating the number of times of processing.

Then, in the CAVLC processing, it is determined whether or not coding processing of all the run before has been completed by determination of the value of zerosLeft. When a positive result is obtained herein, the process moves to step SP37 to complete the processing procedure. On the other hand, when a negative result is obtained in step SP36, the process moves from step SP36 to step SP38.

Then, in the CAVLC processing, it is determined whether or not coding processing of all the run before has been completed by determination of the count value n indicating the number of times of processing. When a positive result is obtained herein, the process moves to step SP37 to complete the processing procedure. On the other hand, when a negative result is obtained in step SP38, the process moves from step SP38 to step SP40. Then, in step SP40, a table which performs coding processing of the run before with the value of zerosLeft is selected, and the process moves to step SP34.

Therefore, in the example of FIG. 2B, in the processing of step SP34, a table in the case where the value of zerosLeft is 4 is selected and the run before of a value 2 which is the number of continuous zero coefficients immediately before a coefficient of +1, which is located at the seventh coefficient from the high order side, is encoded to '01' using the table. In addition, in subsequent step SP35, the value of zerosLeft is updated to the value 2 and then the process moves from steps SP36 and SP38 to step SP40. Here, the zerosLeft selects the table of the value 2. Furthermore, coding processing of the run before value 0 is performed for a coefficient of −3 located at the tenth coefficient from the high order side by using the table. In addition, by repeating the same processing, the value 2 of run before of coefficient data of the subsequent value +8 is encoded to '00' using the table of the value 2 of zerosLeft, and the coding processing of run before is completed.

By processing of FIGS. 5, 6, and 13, a bit stream of '0000 0000 1011 0000 1000 0000 1000 0001 0011 1100 0001 1001 1100 1100' is generated in the example shown FIG. 2B. In addition, FIG. 15 is a chart showing coding processing with the case of FIG. 2B as an example.

On the other hand, at the time of decoding, a bit stream is processed sequentially in the same sequence as in encoding, syntax is sequentially decoded and each of coefficient data is decoded by using the decoded syntax. Furthermore, the decoding is executed in the same manner as the coding processing by sequentially executing the processing procedures of FIGS. 5 and 6 except that a table searching method and a context processing method are executed corresponding to decoding processing. Therefore, the processing at the time of decoding will be described using FIGS. 5 and 6. In addition, FIG. 16 is a chart showing a series of processing in a case where decoding processing of an input bit stream of '0000 0000 1011 0000 1000 0000 1000 0001 0011 1100 0001 1001 1100 1100' is performed in the example of FIG. 2.

In this case, in the decoding processing, the table selected at the time of coding is selected from the tables shown in FIGS. 7 to 10 by calculating the selection reference value nC and 11-bit '0000 0000 101' on the head side of the input bit stream is decoded to coeff token [2, 7] by pattern matching using the table (FIG. 5, step SP2). In addition, the input bit stream is bit-shifted by the 11 bits on the head side.

In addition, subsequently, it is detected that TrailingOnes is a value 2 from the decoding result of coeff token [2, 7], and the next two bits '10' are decoded to trailing ones sign flag − and + on the basis of the detection result (FIG. 5, step SP7). In addition, the input bit stream is bit-shifted by the 2 bits.

Then, it is detected that TotalCoeff is a value 7 from the decoding result of coeff token [2, 7], and context calculation of levels of coefficients of five coefficients 0 is performed for decoding processing since TrailingOnes is a value 2 (FIG. 6, step SP11). Then, by bit-shifting the input bit stream by the decoded level, a bit stream of '1 1100 1100' remains in the example of FIG. 2.

Subsequently, in the decoding processing, a table (FIGS. 11 and 12) in which the TotalCoeff is a value 7 is selected, pattern matching processing of the remaining bit stream is performed, and the front two bits '11' of the remaining input bit stream are decoded to the value 5 of total zeros (FIG. 6, step SP15). In addition, the input bit stream is set to '100 1100' by bit-shifting the remaining input bit stream '1 1100 1100' by the 2 bits.

Then, in the decoding processing, the run before is decoded by sequentially processing the remaining input bit stream '100 1100'.

Here, FIG. 17 is a flow chart showing decoding procedures of run before by comparison with FIG. 13. When the processing procedures start, the decoding processing moves from step SP41 to step SP42 to set TotalCoeff to the count value n indicating the number of times of processing. In addition, total zeros are set to an initial value of zerosLeft which is the number of unprocessed zero coefficients.

In addition, in subsequent step SP43, a table which performs decoding processing of the run before with the value of zerosLeft is selected. Then, the decoding processing proceeds to step SP44 in which decoding processing of the run before specified by the count value n is performed by using the table selected in step SP43. Therefore, in the example of FIG. 2B, for a coefficient of −1 which is located at the fifth coefficient from the high order side, the front two bits '10' of the remaining input bit stream '100 1100' is decoded to the value 1 of run before. In addition, the input bit stream is set to '0 1100' by bit-shifting the remaining input bit stream '100 1100' by the 2 bits.

Then, the decoding processing proceeds to step SP45 in which the value of run before decoded in the last step SP44 is subtracted from the value of zerosLeft and the value of zerosLeft which is the number of unprocessed zero coefficients is updated. In addition, a value 1 is subtracted from the count value n indicating the number of times of processing.

Then, in the decoding processing, it is determined whether or not decoding processing of all the run before has been completed by determination of the value of zerosLeft. When a positive result is obtained herein, the process moves to step SP47 to complete the processing procedure. On the other hand, when a negative result is obtained in step SP46, the process moves from SP46 to step SP48.

Then, in the decoding processing, it is determined whether or not decoding processing of all the run before has been completed by determination of the count value n indicating the number of times of processing. When a positive result is obtained herein, the process moves to step SP47 to complete the processing procedure. On the other hand, when a negative result is obtained in step SP48, the process moves from step SP48 to step SP49. Then, in step SP49, a table which performs coding processing of the run before with the value of zerosLeft is selected, and the process moves to step SP44.

Therefore, in the example of FIG. 2B, in the processing of step SP44, a table in the case where the value of zerosLeft is 4 is selected and the front two bits '01' of the remaining input bit stream '0 1100' is decoded to the value 2 of run before for a coefficient of +1, which is located at the seventh coefficient from the high order side, by pattern matching processing using the table. In addition, the input bit stream is set to '100' by bit-shifting the remaining input bit stream '0 1100' by the 2 bits.

In addition, in subsequent step SP45, the value of zerosLeft is updated to the value 2 and then the process moves from steps SP46 and SP48 to step SP44. Here, the zerosLeft selects the table of the value 2. In addition, by pattern matching processing using the table, the front one bit '1' of the remaining input bit stream '100' is decoded to the value 0 of run before for a coefficient of −3 which is located at the tenth coefficient from the high order side. In addition, the input bit stream is set to '00' by bit-shifting the remaining input bit stream '100' by the 1 bit. In addition, by repeating the same processing, a table in which the zerosLeft is a value 2 is selected and is subjected to pattern matching processing for coefficient data of the subsequent value +8, and the front two bits '00' of the remaining input bit stream '00' is decoded to the value 2 of run before. Subsequently, the value of zerosLeft is updated to the value 0 in step SP45 and the positive result is obtained in step SP46, completing the decoding processing.

However, in the decoding processing described above, a table is selected on the basis of the last processing result to decode a specific syntax element. Specifically, in case of decoding the run before, a variable length table used in the decoding changes with the total number of unprocessed run numbers, such that the total number of unprocessed run numbers is decided by decoding of the last run before. Therefore, in the decoding processing of run before, it is necessary to sequentially process the continuous run before. After all, there was a problem that the speed of the decoding processing could not be increased.

DISCLOSURE OF THE INVENTION

The present invention has been made in consideration of the above points and is to propose a decoding method, a program for a decoding method, a recording medium with a recorded program for a decoding method, and a decoding device capable of increasing the speed of decoding processing compared with a related art.

In order to solve the above-described problem, the present invention is applied to a decoding method of decoding a coefficient data row subjected to orthogonal transform processing in a predetermined coding processing unit from an input bit stream and includes: a table selection step of selecting a table corresponding to the number of unprocessed coefficient data of the specific value; a continuous number detection step of detecting continuous numbers of the specific syntax element in which the number of coefficient data of the specific value is 0 by using the table selected in the table selection step; a specific syntax element decoding step of decoding the specific syntax element subsequent to the specific syntax element of the continuous numbers detected in the continuous number detection step; an update step of updating the number of unprocessed coefficient data of the specific value corresponding to processing of the continuous number detection step and the specific syntax element decoding step; and a coefficient data decoding step of decoding the coefficient data row on the basis of the continuous numbers detected in the continuous number detection step and a decoding result of the specific syntax element decoding step.

Furthermore, the present invention is applied to a program for a decoding method of decoding a coefficient data row subjected to orthogonal transform processing in a predetermined coding processing unit from an input bit stream, and the decoding method includes: a table selection step of selecting a table corresponding to the number of unprocessed coefficient data of the specific value; a continuous number detection step of detecting continuous numbers of the specific syntax element in which the number of coefficient data of the specific value is 0 by using the table selected in the table selection step; a specific syntax element decoding step of decoding the specific syntax element subsequent to the specific syntax element of the continuous numbers detected in the continuous number detection step; an update step of updating the number of unprocessed coefficient data of the specific value corresponding to processing of the continuous number detection step and the specific syntax element decoding step; and a coefficient data decoding step of decoding the coefficient data row on the basis of the continuous numbers detected in the continuous number detection step and a decoding result of the specific syntax element decoding step.

Furthermore, the present invention is applied to a recording medium with a recorded program for a decoding method of decoding a coefficient data row subjected to orthogonal transform processing in a predetermined coding processing unit from an input bit stream, and the decoding method includes: a table selection step of selecting a table corresponding to the number of unprocessed coefficient data of the specific value; a continuous number detection step of detecting continuous numbers of the specific syntax element in which the number of coefficient data of the specific value is 0 by using the table selected in the table selection step; a specific syntax element decoding step of decoding the specific syntax element subsequent to the specific syntax element of the continuous numbers detected in the continuous number detection step; an update step of updating the number of unprocessed coefficient data of the specific value corresponding to processing of the continuous number detection step and the specific syntax element decoding step; and a coefficient data decoding step of decoding the coefficient data row on the basis of the continuous numbers detected in the continuous number detection step and a decoding result of the specific syntax element decoding step.

Furthermore, the present invention is applied to a decoding device that decodes a coefficient data row subjected to orthogonal transform processing in a predetermined coding processing unit from an input bit stream and includes: a table selecting section that selects a table corresponding to the number of unprocessed coefficient data of the specific value; a continuous number detecting section that detects continuous numbers of the specific syntax element in which the number of coefficient data of the specific value is 0 by using the table selected in the table selecting section; a specific syntax element decoding section that decodes the specific syntax element subsequent to the specific syntax element of the continuous numbers detected in the continuous number detecting section; an update section that updates the number of unprocessed coefficient data of the specific value corresponding to processing of the continuous number detecting section and the specific syntax element decoding section; and a coefficient data decoding section of decoding the coefficient data row on the basis of the continuous numbers detected in the continuous number detecting section and a decoding result of the specific syntax element decoding section.

According to the configuration of the present invention, in the specific syntax element in which the number of coefficient data of the specific value is 0, continuous syntax elements are collectively detected and decoded. In addition, also for a specific syntax element in which the number of continuous coefficient data of the specific value is not 0, simultaneous decoding is performed. Therefore, since these specific syntax elements can be processed collectively without performing processing for every syntax element, the speed of decoding processing can be increased compared with that in the related art.

According to the present invention, the decoding processing can be performed at the high speed compared with the related art.

BRIEF DESCRIPTION OF THE DRAWINGS

FIG. 1 is a chart showing syntax elements in CAVLC processing based on the ITU-T H.264 method.

FIGS. 2A and 2B are charts provided for explanation of the configuration of a bit stream in CAVLC processing.

FIG. 3 is a chart provided for explanation of the configuration of a bit stream in CAVLC processing in a different example from FIG. 2.

FIG. 4 is a chart showing the sequence of a syntax element.

FIG. 5 is a flow chart showing the coding procedures in CAVLC processing.

FIG. 6 is a flow chart showing the continuation of FIG. 5.

FIG. 7 is a chart showing a variable length coding table which performs coding processing of coeff token.

FIG. 8 is a chart showing the continuation of FIG. 7.

FIG. 9 is a chart showing the continuation of FIG. 8.

FIG. 10 is a chart showing the continuation of FIG. 9.

FIG. 11 is a chart showing a variable length coding table which performs coding processing of total zeros prepared in a coding processing unit of 4×4 blocks.

FIG. 12 is a chart showing a variable length coding table which performs coding processing of total zeros prepared in a coding processing unit of 2×2 blocks.

FIG. 13 is a flow chart showing a coding procedure of run before.

FIG. 14 is a chart showing a coding processing table of run before.

FIG. 15 is a chart showing processing procedures in a case where coding processing of a coefficient data row is performed in an example of FIG. 2.

FIG. 16 is a chart showing processing procedures in a case where decoding processing of a coefficient data row is performed in an example of FIG. 2.

FIG. 17 is a flow chart showing a decoding procedure of run before.

FIG. 18 is a block diagram showing a decoding device of a first embodiment of the present invention.

FIG. 19 is a chart showing the configuration of an input bit stream in the decoding device of FIG. 18.

FIG. 20 is a block diagram showing a section for comparing a plurality of simultaneous variable length code tables of run numbers of the decoding device of FIG. 18 in detail.

FIG. 21 is a chart showing a table in a case where zerosLeft of a continuous number determining section in the section for comparing a plurality of simultaneous variable length code tables of run numbers of FIG. 20 is a value 1 or a value 2.

FIG. 22 is a chart showing a table in a case where zerosLeft of a continuous number determining section in the section for comparing a plurality of simultaneous variable length code tables of run numbers of FIG. 20 is a value 3 to a value 6.

FIG. 23 is a chart showing a table in a case where zerosLeft of a continuous number determining section in the section for comparing a plurality of simultaneous variable length code tables of run numbers of FIG. 20 is a value 7 or more.

FIG. 24 is a chart showing a table of a run before decoding section in the section for comparing a plurality of simultaneous variable length code tables of run numbers of FIG. 20.

FIG. 25 is a flow chart showing processing procedures in the section for comparing a plurality of simultaneous variable length code tables of run numbers of FIG. 20.

FIG. 26 is a block diagram showing a decoding device of a second embodiment of the present invention.

FIG. 27 is a chart showing a table applied to the decoding device of FIG. 26.

FIG. 28 is a chart showing the continuation of FIG. 27.

BEST MODE FOR CARRYING OUT THE INVENTION

Hereinafter, embodiments of the present invention will be described in detail referring to the drawings suitably.

(1) First Embodiment (1-1) Configuration of the Embodiment

FIG. 18 is a block diagram showing a decoding device of a first embodiment of the present invention. The decoding device 1 decodes coefficient data in each coding processing unit from an input bit stream bitstream, which is based on the ITU-T H.264 method and is input in a sequential manner, by CAVLC processing. In the decoding device 1, processing of each syntax element for decoding the coefficient data is executed in the same manner as a known decoding device described using FIGS. 5 and 6, except for the processing of run before. The decoding device 1 performs dequantization and inverse DCT processing of decoded coefficient data in a dequantization and inverse DCT section 2 and then adds a predicted value, which is generated in an intra prediction section and an inter prediction section that re not shown, with output data S1 of the dequantization and inverse DCT section 2, thereby decoding original image data.

In the decoding device 1, for example, each functional block shown in FIG. 18 is formed by an arithmetic processing section, such as a digital signal processor. In addition, although a program for executing the arithmetic processing section is provided in a state where the program is installed in the decoding device 1 beforehand in this embodiment, the program may be provided instead in a state where the program is recorded in recording media, such as an optical disk, a magnetic disk, and a memory card, or may be provided through a network, such as the Internet. In addition, the decoding device 1 may also be constructed by hardware.

In this decoding device 1, a variable length code table comparing section 3 selects a variable length decoding table used in decoding of coeff token according to the control of a control section 4, decodes the coeff token by pattern matching using the selected variable length decoding table, and notifies the control section 4 of it. Furthermore, a decoding result of total zero is similarly notified to the control section 4.

A section for comparing a plurality of simultaneous variable length code tables of run numbers 5 detects and outputs the number x of continuous run before of a value 0 and a value of run before other than the value 0 from the input bit stream bitstream according to the control of the control section 4.

A significant table creating section 6 creates a significant table showing the arrangement of non-zero coefficients from the number x of continuous run before of a value 0 and the value of run before other than the value 0 which are output from the section for comparing a plurality of simultaneous variable length code tables of run numbers 5. More specifically, the value of run before other than the value 0 indicates the number of coefficient data of a value 0 subsequent to corresponding non-zero coefficient data. On the other hand, the number x of continuous run before of a value 0 indicates the number of non-zero coefficients subsequent to corresponding non-zero coefficient data. Using the relationship, the significant table creating section 6 creates a significant table in which identification information for identifying a non-zero coefficient and a coefficient of a value 0 is expressed in a table format in the order of arrangement of syntax elements in the input bit stream bitstream. The significant table creating section 6 outputs the identification data of the significant table in the order corresponding to the dequantization and inverse DCT section 2 from the low order side.

A coefficient decoding section 7 decodes a trailing ones sign flag and a level sequentially from the input bit stream bitstream according to the control of the control section 4 and outputs them.

A temporary coefficient storage section 8 temporarily stores the decoding result output from the coefficient decoding section 7 and rearranges it in the order corresponding to the processing in the dequantization and inverse DCT section 2. In addition, the rearranged decoding result is sequentially output at the timing at which corresponding identification data is output from the significant table creating section 6.

A coefficient storage section 9 stores a coefficient value of a value 0 when the identification data output from the significant table creating section 6 indicates a coefficient of the value 0, while the coefficient storage section 9 stores the decoding result output from the temporary coefficient storage section 8 and reproduces coefficient data in the coding processing unit when the identification data output from the significant table creating section 6 indicates a non-zero coefficient. The coefficient storage section 9 outputs the coefficient data sequentially in the order corresponding to processing of the dequantization and inverse DCT section 2.

The dequantization and inverse DCT section 2 performs dequantization processing and inverse DCT processing of output data of the coefficient storage section 9 and outputs the output data.

The control section 4 is a control section that controls the overall operation of the decoding device 1. When decoding in each coding processing unit starts, the control section 4 calculates the selection reference value nC, instructs a table used in processing from the calculation result, and instructs the variable length code table comparing section 3 to decode the coeff token. In addition, the decoding result of coeff token is acquired from the variable length code table comparing section 3 and TotalCoeff and TrailingOnes are detected.

In addition, decoding of trailing ones sign flag is instructed to the coefficient decoding section 7 on the basis of the detected TrailingOnes, and decoding of level is further instructed to the coefficient decoding section 7 on the basis of TotalCoeff.

Furthermore, the control section 4 instructs the variable length code table comparing section 3 to decode subsequent total zeros and acquires a decoding result. The control section 4 instructs the section for comparing a plurality of simultaneous variable length code tables of run numbers 5 to decode the run before on the basis of the acquired decoding result of the total zeros. In addition, on the basis of the decoding result of coeff token and the decoding result of total zeros, processing of the decoding result output from the section for comparing a plurality of simultaneous variable length code tables of run numbers 5 is instructed to the significant table creating section 6.

Figure 19:
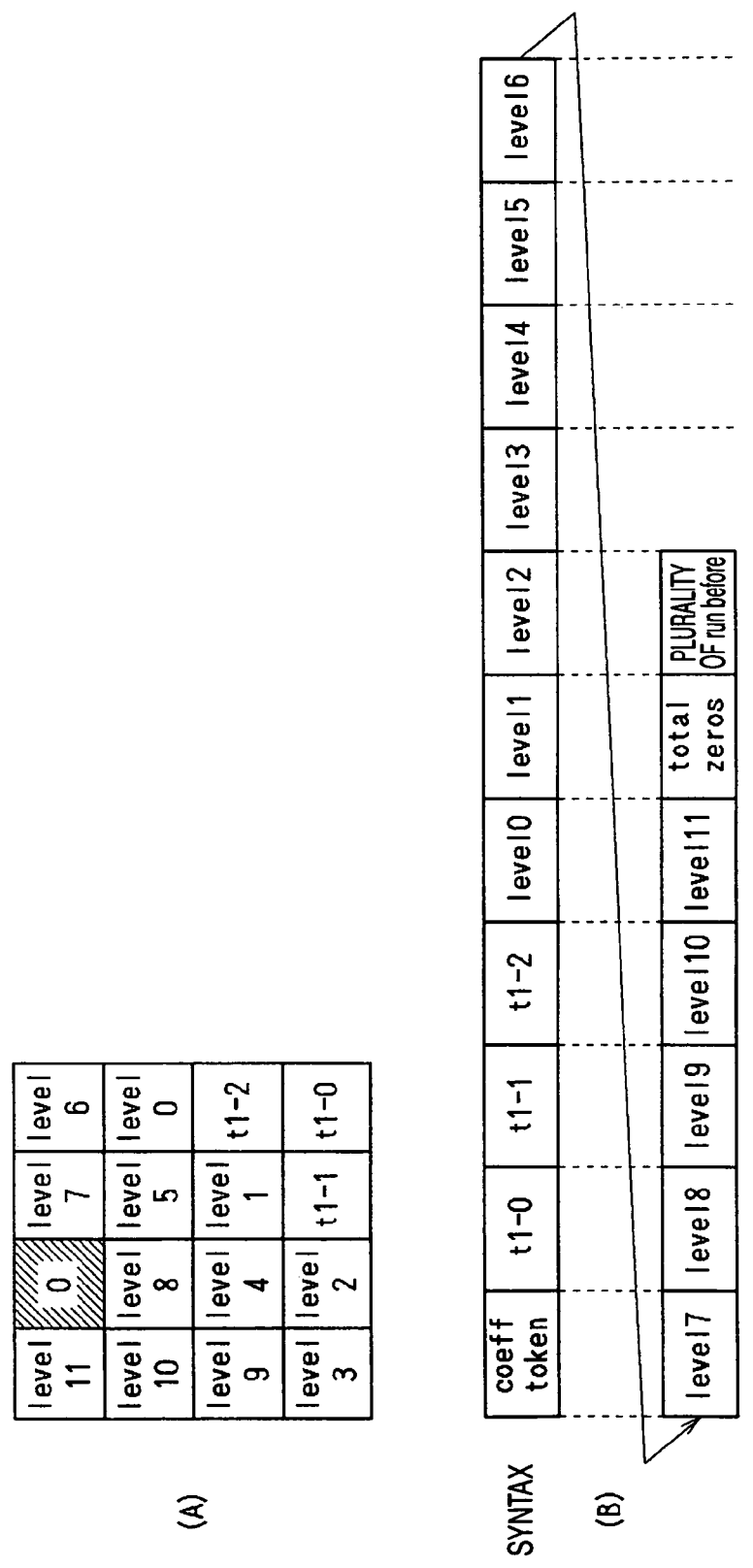

Therefore, in the decoding device 1, as shown in FIG. 19 compared with FIG. 3, decoding of run before is collectively executed such that each syntax element is decoded from the input bit stream bitstream in the same order as in the related art.

FIG. 20 is a block diagram showing the section for comparing a plurality of simultaneous variable length code tables of run numbers 5 in detail. A continuous number determining section 11 selects one table from a plurality of tables according to the value of zerosLeft and detects the number x of continuous run before of a value 0 by pattern matching of the input bit stream bitstream using the selected table by the control of the control section 4.

Here, in a table of run before shown in FIG. 14, a value 1 is output in a bit length corresponding to the value of zerosLeft when the value of run before is 0. Therefore, when the zerosLeft is the value 1 or the value 2, it is understood that the number of continuous bits of the value 1 is the number x of continuous run before of a value 0. In addition, when the zerosLeft is a value 3 to a value 6, it is understood that a value obtained by dividing the number of continuous bits of the value 1 by the value 2 is the number x of continuous run before of a value 0. In addition, when the zerosLeft is a value 7 or more, it is understood that a value obtained by dividing the number of continuous bits of the value 1 by the value 3 is the number x of continuous run before of a value 0.

On the basis of the relationship between the zerosLeft and the number x of continuous run before of a value 0, the continuous number determining section 11 selects a table of FIG. 21, executes processing of pattern matching, and detects the number x of continuous run before of a value 0 in the case when the zerosLeft is a value 1 or a value 2. In addition, when the zerosLeft is the value 3 to the value 6, a table of FIG. 22 is selected, processing of pattern matching is executed, and the number x of continuous run before of a value 0 is detected. In addition, when the zerosLeft is the value 7 or more, a table of FIG. 23 is selected, processing of pattern matching is executed, and the number x of continuous run before of a value 0 is detected.

In addition, the continuous number determining section 11 reduces a load of processing by changing the bit length of the input bit stream bitstream, which is subjected to the pattern matching, according to the unprocessed Coeff number. In FIGS. 21 to 23, a range of the pattern matching is shown in a circle mark. The continuous number determining section 11 selects a number with a largest value among numbers of continuous run before of a value 0, which are detected in each range, and sets it to the number x of continuous run before of a value 0. In addition, the amount of bit shift corresponding to this is detected and output to a barrel shift 12.

When the number x of continuous run before of a value 0 is detected in the continuous number determining section 11, the barrel shift 12 performs bit shift of the input bit stream bitstream by the amount of bit shift output from the continuous number determining section 11 and selectively outputs to a run before decoding section 13 the input bit stream bitstream corresponding to run before other than the value 0.

The run before decoding section 13 decodes run before from the input bit stream bitstream output from the barrel shift 12 by pattern matching using the table shown in FIG. 24. Here, the input bit stream bitstream output from the barrel shift 12 is the input bit stream bitstream corresponding to run before other than the value 0 since the number x of continuous run before of a value 0 is detected in the continuous number determining section 11. Accordingly, the table shown in FIG. 24 is created to exclude the run before of the value 0 from the known run before table shown in FIG. 14.

FIG. 25 is a flow chart showing in detail a processing procedure of the control section 4 that controls the section for comparing a plurality of simultaneous variable length code tables of run numbers 5. When the processing procedure starts, the control section 4 moves from step SP51 to step SP52. Here, the control section 4 sets the TotalCoeff to a count value n which counts the number of times of processing. In addition, total zeros are set to an initial value of zerosLeft which is the number of unprocessed zero coefficients.

Then, in subsequent step SP53, selection of tables of FIGS. 21 to 23 is instructed to the continuous number determining section 11 on the basis of zerosLeft.

Then, the control section 4 moves to step SP54 in which the continuous number determining section 11 detects the number x of continuous run before of a value 0 and the run before decoding section 13 detects the decoding result of run before other than the subsequent value 0.

Then, in step SP55, the control section 4 updates the value of zerosLeft and the count value n indicating the number of times of processing according to the processing in last step SP54.

Then, in subsequent step SP56, it is determined whether or not coding processing of all the run before has been completed by determination of the value of zerosLeft. When a positive result is obtained herein, the process moves to step SP57 to complete the processing procedure.

On the other hand, when a negative result is obtained in step SP56, the process of the control section 4 moves from step SP56 to step SP58. Here, the control section 4 determines whether or not coding processing of all the run before has been completed by determination of the count value n indicating the number of times of processing. When a positive result is obtained herein, the process moves to step SP57 to complete the processing procedure.

On the other hand, when a negative result is obtained in step SP58, the process moves from step SP58 to step SP59. Then, in subsequent step SP59, selection of tables of FIGS. 21 to 23 is instructed to the continuous number determining section 11 on the basis of the current value of zerosLeft, and the process moves to step SP54.

(1-2) Operations of the Embodiment

In the above configuration, in the decoding device 1 (FIG. 18), the input bit stream bitstream based on the ITU-T H.264 method is input to the variable length code table comparing section 3, and TrailingOnes is decoded by pattern matching using a table (FIGS. 7 to 10) according to the selection reference value nC. In addition, on the basis of the TrailingOnes, subsequent trailing ones sign flag and level are decoded in the coefficient decoding section 7. In addition, subsequent total zeros are decoded by the variable length code table comparing section 3 (FIGS. 11 and 12), and the subsequent run before is processed by the section for comparing a plurality of simultaneous variable length code tables of run numbers 5. In addition, the processing result of the section for comparing a plurality of simultaneous variable length code tables of run numbers 5 is processed in the significant table creating section 6, and a coefficient data row obtained by scanning a coding processing unit subjected to orthogonal transform processing in a zigzag manner is created from the processing result of the significant table creating section 6 and a processing result of level of the coefficient decoding section 7 obtained through the temporary coefficient storage section 8 (FIGS. 2, 3, and 19). In the decoding device 1, the coefficient data row is processed in the dequantization and inverse DCT section 2 and is then decoded to image data.

In processing of run before in the section for comparing a plurality of simultaneous variable length code tables of run numbers 5 and the significant table creating section 6 (FIG. 20), the number x of continuous run before of a value 0 of the input bit stream bitstream is detected by the pattern matching using a table corresponding to a current value of zerosLeft in the continuous number determining section 11 and the run before which is not the continuous value 0 is decoded in the run before decoding section 13 on the basis of the detection result. Furthermore, in processing of the continuous number determining section 11 and the run before decoding section 13, the value of zerosLeft is updated and the number of continuous run before of continuous values 0 is detected and the run before which is not the continuous value 0 is decoded in the run before decoding section 13 on the basis of the detection result (FIGS. 20 and 25). In the decoding device 1, the processing in the section for comparing a plurality of simultaneous variable length code tables of run numbers 5 is repeated, the processing result of the section for comparing a plurality of simultaneous variable length code tables of run numbers 5 is processed in the significant table creating section 6, and a coefficient data row is stored in the coefficient storage section 9 according to the processing result of the significant table creating section 6. In the decoding device 1, by the processing of run before in the section for comparing a plurality of simultaneous variable length code tables of run numbers 5 and the significant table creating section 6, the speed of decoding processing can be increased compared with the related art.

That is, in known decoding of run before described in FIG. 17, it is necessary to repeat processing of steps SP44 to SP45 by the number of syntax elements of run before. However, in this embodiment, the number of continuous run before of a value 0 and run before which is not the continuous value 0 can be processed collectively. Therefore, since the number of times of processing of steps SP54 and SP55 of FIG. 25 corresponding to steps SP44 to SP45 of FIG. 17 can be greatly reduced compared with the case of FIG. 17, time required for processing of run before can be shortened. As a result, the speed of decoding processing can be increased.

In addition, in a case where processing is performed by detecting the number of continuous run before of a value 0 in such a manner, the more the number of continuous run before of a value 0 increases, the more the number of times of processing of steps SP54 and SP55 can be reduced. Therefore, since the number of continuous run before of a value 0 also increases as the number of run before of the value 0 increases, the processing time can be shortened by reducing the number of times of processing of steps SP54 and SP55.

However, in an opposite view, when the run before is not the value 0, it is also thought that the time for decoding processing cannot be reduced since the number of times of processing of steps SP54 and SP55 cannot be reduced correspondingly. In the case when the run before is not the value 0, however, the number of level in an input bit stream also decreases correspondingly and coefficient data of the value 0 increases. Therefore, in this case, decoding processing can be performed at the high speed since the time is not taken for the decoding processing.

In practice, as shown in FIG. 3, in the input bit stream, the number of syntax elements of level is 12. In the case when the number of syntax elements of run before is 14, it is necessary to repeat processing of steps SP54 to SP55 fourteen times in the known method shown in FIG. 17. On the other hand, in the decoding device 1, thirteen of fourteen syntax elements of the run before are the value 0 and the last one is a value 1. Accordingly, the fourteen syntax elements of run before can be processed simultaneously.

In addition, instead of such processing for detecting the number of syntax elements of run before that continue with the value 0, it may also be considered to increase the processing speed by decoding a plurality of run before simultaneously and in parallel by extending a known table of run before shown in FIG. 14. However, in this case, there is a disadvantage that the configuration of a table for decoding the run before becomes greatly large. On the other hand, according to this embodiment, the processing speed can be increased by effectively avoiding an increase in the size of a table and processing a plurality of run before syntax elements collectively.

(1-3) Effects of the Embodiment

According to the above configuration, the speed of decoding processing can be increased compared with that in the related art by detecting continuous numbers of a syntax element of a specific value, such as a value of 0, and decoding the syntax element on the basis of the detection result.

In addition, since the specific syntax element is a syntax element of run before, the processing of run before can be executed at the high speed. As a result, compared with the related art, the speed of decoding processing can be increased.

In addition, since the input bit stream to be decoded is a bit stream obtained by the CAVLC processing based on the ITU-T H.264 method, the input bit stream obtained by the CAVLC processing based on the ITU-T H.264 method can be decoded at the high speed compared with the related art.

More specifically, the input bit stream obtained by the CAVLC processing based on the ITU-T H.264 method can be decoded at the high speed compared with the related art by providing a step of decoding syntax elements of coeff token and total zeros.

In addition, by providing a level decoding step of decoding the syntax element of level, the run number and a coefficient value which is not a value 0 can be applied to processing of an input bit stream subjected to variable length coding individually, so that the input bit stream can be decoded at the high speed compared with the related art.

(2) Second Embodiment

FIG. 26 is a block diagram showing a decoding device of a second embodiment of the present invention by comparison with FIG. 18. A decoding device 21 is configured in the same manner as the decoding device 1 of the first embodiment except that a section for comparing a plurality of simultaneous variable length code tables of run numbers 22 and a coefficient storage section 23 are provided instead of the section for comparing a plurality of simultaneous variable length code tables of run numbers 5, the significant table creating section 6, and the coefficient storage section 9.

Here, by the control of the control section 4, the section for comparing a plurality of simultaneous variable length code tables of run numbers 22 selects one of a plurality of tables according to the value of zerosLeft, and detects the number x of continuous run before of a value 0 and the decoding results of the continuous run before simultaneously by pattern matching of the input bit stream bitstream using the selected table, and outputs the number x of continuous run before of a value 0 and the decoding results of the subsequent run before in a pair.

Here, FIGS. 27 and 28 are examples of the case where the zerosLeft is 1 and are graphs showing tables held in the section for comparing a plurality of simultaneous variable length code tables of run numbers 22. This table is formed by collecting the tables mentioned in FIGS. 21 to 24 into one for every zerosLeft such that the number x of continuous run before of a value 0 and the decoding result of subsequent run before can be detected simultaneously.

The coefficient storage section 23 builds and stores coefficient data on the basis of output data of the section for comparing a plurality of simultaneous variable length code tables of run numbers 22 and then outputs the coefficient data to the dequantization and inverse DCT section 2.

Like the embodiment, by unifying a table for detecting the number x of continuous run before of a value 0 and a table for decoding the subsequent run before, the same effects as in the above-described embodiment can be obtained even if the number x of continuous run before of a value 0 and the decoding results of the subsequent run before are output in a pair.

(3) Other Embodiments

In addition, although the case where the significant table creating section 6 creates a significant table using identification data for identifying a non-zero coefficient and a coefficient of a value 0 and the coefficient storage section 9 decodes an original coefficient data row using the significant table has been described in the first embodiment, the present invention is not limited thereto but may decode an original coefficient data row by generating a coefficient value of a value 0 on the basis of a processing result of the section for comparing a plurality of simultaneous variable length code tables of run numbers 22 and storing the generated coefficient value in the coefficient storage section 9. In this manner, the significant table creating section can be omitted.

In addition, contrary to this, the number x of continuous run before of a value 0 may be directly input to the coefficient storage section 9 and a coefficient of a value 0 may be generated in the coefficient storage section 9 on the basis of the number x to thereby reduce the processing cycle.

Furthermore, although the case where the present invention is applied to the decoding device has been described in the above embodiment, the present invention is not limited thereto, but the present invention may also be applied to a decoding device having a coding function such that tables of FIGS. 21 to 24 are used in coding processing. In addition, in this case, simultaneous variable length coding processing of a plurality of numbers of runs can be performed if the tables described in the second embodiment are used.

Furthermore, although the case where continuous syntax elements of the value 0 are detected for a specific syntax element that is the run before and the plurality of continuous syntax elements are collectively processed has been described in the above embodiment, the present invention is not limited thereto, but the time taken for processing may be shortened by detecting the number of various syntax elements that continue with various values and collectively processing the plurality of continuous syntax elements.

Furthermore, although the case where the present invention is applied to decoding processing of the input bit stream by CAVLC processing based on the ITU-T H.264 method has been described in the above embodiment, the present invention is not limited thereto but may be widely applied to cases of decoding the input bit stream in various formats.

INDUSTRIAL APPLICABILITY

The present invention may be applied to decoding processing of an input bit stream by CAVLC processing based on the ITU-T H.264 method, for example.

DESCRIPTION OF REFERENCE NUMERALS 1, 21: decoding device
2: dequantization and inverse DCT section
3: variable length code table comparing section
4: control section
5, 22: section for comparing a plurality of simultaneous variable length code tables of run numbers
6: significant table creating section
7: coefficient decoding section
8: temporary coefficient storage section
9, 23: coefficient storage section
11: continuous number determining section
12: barrel shift
13: run before decoding section

The invention claimed is:

1. A decoding method of decoding a coefficient data row subjected to orthogonal transform processing in a predetermined coding processing unit from an input bit stream in which using a table selected corresponding to the number of unprocessed coefficient data of a specific value in the coefficient data row, at least a specific syntax element indicating the number of continuous coefficient data of the specific value in the coefficient data row is assigned for every coefficient data which is not the specific value, comprising:
    a table selection step of selecting a table corresponding to the number of unprocessed coefficient data of the specific value;
    a continuous number detection step of detecting continuous numbers of the specific syntax element in which the number of coefficient data of the specific value is 0 by using the table selected in the table selection step by changing the bit length of the input bit stream according to the number of unprocessed coefficient data and then subjecting the bit stream to pattern matching using the selected table;
    a specific syntax element decoding step of decoding the specific syntax element subsequent to the specific syntax element of the continuous numbers detected in the continuous number detection step;
    an update step of updating the number of unprocessed coefficient data of the specific value corresponding to processing of the continuous number detection step and the specific syntax element decoding step; and
    a coefficient data decoding step of decoding the coefficient data row on the basis of the continuous numbers detected in the continuous number detection step and a decoding result of the specific syntax element decoding step.

2. The decoding method according to claim 1, wherein the specific syntax element is a syntax element of run before.

3. The decoding method according to claim 2, wherein the input bit stream is a bit stream obtained by CAVLC processing based on the ITU-T H.264 method.

4. The decoding method according to claim 3, further comprising:
    a coeff token decoding step of decoding a syntax element of coeff token; and
    a total zeros decoding step of decoding a syntax element of total zeros.

5. The decoding method according to claim 2, further comprising:
a level decoding step of decoding a syntax element of level.

6. A non-transitory program for a decoding method of decoding a coefficient data row subjected to orthogonal transform processing in a predetermined coding processing unit from an input bit stream,
wherein using a table selected corresponding to the number of unprocessed coefficient data of a specific value in the coefficient data row, at least a specific syntax element indicating the number of continuous coefficient data of the specific value in the coefficient data row is assigned for every coefficient data which is not the specific value in the input bit stream, and
the decoding method includes:
a table selection step of selecting a table corresponding to the number of unprocessed coefficient data of the specific value;
a continuous number detection step of detecting continuous numbers of the specific syntax element in which the number of coefficient data of the specific value is 0 by using the table selected in the table selection step by changing the bit length of the input bit stream according to the number of unprocessed coefficient data and then subjecting the bit stream to pattern matching using the selected table;
a specific syntax element decoding step of decoding the specific syntax element subsequent to the specific syntax element of the continuous numbers detected in the continuous number detection step;
an update step of updating the number of unprocessed coefficient data of the specific value corresponding to processing of the continuous number detection step and the specific syntax element decoding step; and
a coefficient data decoding step of decoding the coefficient data row on the basis of the continuous numbers detected in the continuous number detection step and a decoding result of the specific syntax element decoding step.

7. A recording medium with a recorded non-transitory program for a decoding method of decoding a coefficient data row subjected to orthogonal transform processing in a predetermined coding processing unit from an input bit stream,
wherein using a table selected corresponding to the number of unprocessed coefficient data of a specific value in the coefficient data row, at least a specific syntax element indicating the number of continuous coefficient data of the specific value in the coefficient data row is assigned for every coefficient data which is not the specific value in the input bit stream, and
the decoding method includes:
a table selection step of selecting a table corresponding to the number of unprocessed coefficient data of the specific value;
a continuous number detection step of detecting continuous numbers of the specific syntax element in which the number of coefficient data of the specific value is 0 by using the table selected in the table selection step by changing the bit length of the input bit stream according to the number of unprocessed coefficient data and then subjecting the bit stream to pattern matching using the selected table;
a specific syntax element decoding step of decoding the specific syntax element subsequent to the specific syntax element of the continuous numbers detected in the continuous number detection step;
an update step of updating the number of unprocessed coefficient data of the specific value corresponding to processing of the continuous number detection step and the specific syntax element decoding step; and
a coefficient data decoding step of decoding the coefficient data row on the basis of the continuous numbers detected in the continuous number detection step and a decoding result of the specific syntax element decoding step.

8. A decoding device that decodes a coefficient data row subjected to orthogonal transform processing in a predetermined coding processing unit from an input bit stream in which using a table selected corresponding to the number of unprocessed coefficient data of a specific value in the coefficient data row, at least a specific syntax element indicating the number of continuous coefficient data of the specific value in the coefficient data row is assigned for every coefficient data which is not the specific value, comprising:
a table selecting section that selects a table corresponding to the number of unprocessed coefficient data of the specific value;
a continuous number detecting section that detects continuous numbers of the specific syntax element in which the number of coefficient data of the specific value is 0 by using the table selected in the table selecting section by changing the bit length of the input bit stream according to the number of unprocessed coefficient data and then subjecting the bit stream to pattern matching using the selected table;
a specific syntax element decoding section that decodes the specific syntax element subsequent to the specific syntax element of the continuous numbers detected in the continuous number detecting section;
an update section that updates the number of unprocessed coefficient data of the specific value corresponding to processing of the continuous number detecting section and the specific syntax element decoding section; and
a coefficient data decoding section of decoding the coefficient data row on the basis of the continuous numbers detected in the continuous number detecting section and a decoding result of the specific syntax element decoding section.

* * * * *